(12) United States Patent
Durvasula et al.

(10) Patent No.: US 9,571,188 B2
(45) Date of Patent: Feb. 14, 2017

(54) APPARATUS AND METHOD FOR INLINE MONITORING OF TRANSMISSION SIGNALS

(71) Applicant: Hughes Network Systems, LLC, Germantown, MD (US)

(72) Inventors: Bhanu P. Durvasula, Potomac, MD (US); Tariq Muhammad, Germantown, MD (US); Neil H. Tender, Bethesda, MD (US); Esmail H. Chitalwala, Germantown, MD (US); Alex Saad, Vienna, VA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 14/564,838

(22) Filed: Dec. 9, 2014

(65) Prior Publication Data
US 2016/0164598 A1   Jun. 9, 2016

(51) Int. Cl.
*H04B 10/079*   (2013.01)

(52) U.S. Cl.
CPC ...... *H04B 10/0795* (2013.01); *H04B 10/0791* (2013.01); *H04B 10/07955* (2013.01)

(58) Field of Classification Search
CPC ............. H04B 10/079; H04B 10/0791; H04B 10/0795; H04B 10/07955

USPC ................... 398/13, 20–21, 28–29
See application file for complete search history.

(56) References Cited

U.S. PATENT DOCUMENTS

2014/0136139 A1*   5/2014   LaBonge ............... H04B 10/07
                                                             702/122

\* cited by examiner

*Primary Examiner* — Leslie Pascal
(74) *Attorney, Agent, or Firm* — Nath, Goldberg & Meyer; Leonid D. Thenor

(57) ABSTRACT

An apparatus for inline monitoring of transmit signals is disclosed. The apparatus includes a processor, and one or more fiber optic lines for supplying a transmit signal to/from a remote transmission station. The processor is configured to receive input for selecting one or more fiber optic lines for examination, determine at least one property of the transmit signal to be monitored, and retrieve information corresponding to the at least one property for a predetermined period of time. The processor is further configured to output a visual representation of the retrieved information, perform an analysis of the retrieved information and the visual representation, and facilitate identification of at least one status associated with the transmit signal based, at least in part, on the analysis.

26 Claims, 20 Drawing Sheets

FIG. 2A

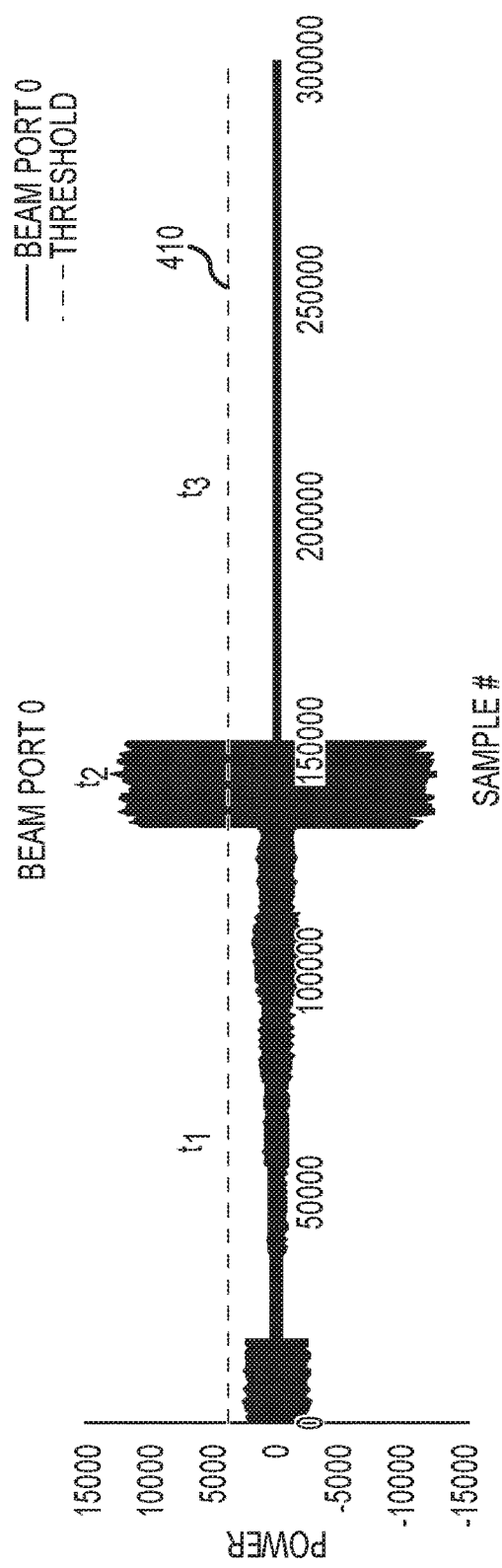

APPARATUS AND METHOD FOR INLINE MONITORING OF TRANSMISSION SIGNALS

BACKGROUND INFORMATION

Modern communication systems are complex and require the use of a great number of hardware components for proper operation. Hardware components, however, can be subject to malfunction and failure. Such failure can result in significant system downtime and/or customer dissatisfaction. Depending on the particular hardware, for example, customers may be unable to access some or all features of the system including data, voice, etc. Furthermore, customers may contact service centers to voice dissatisfaction, possibly resulting in a desire to change service providers. It is also necessary to staff sufficient representatives to address customer concerns, thereby resulting in additional costs for the service provider.

Identifying the cause of hardware malfunction can be difficult due to the overall complexity of the system. For example, an individual substation within a communication network can have a great number of hardware components that are susceptible to hardware and/or software failure. It is typically necessary to test hardware components individually in order to verify proper operation, thus requiring a significant amount of time. Furthermore, signals are received from and transmitted to different substations, and errors can be propagated from one substation to another, thereby making it increasingly difficult to identify the error source. Based on the foregoing, it would be desirable to provide an approach for improving the manner in which errors (e.g., hardware, software, configuration, etc.) are isolated in a communication system.

BRIEF SUMMARY

An apparatus and method are disclosed for inline monitoring of transmit signals. According to an embodiment, a method includes selecting one or more fiber optic lines that are used for supplying transmit signals to/from a remote substation, determining at least one property of the transmit signal to be monitored, and retrieving information corresponding to the at least one property for a predetermined period of time. The method further includes generating a visual representation of the retrieved information, performing an analysis of the retrieved information and the visual representation, and identifying at least one status associated with the transmit signal based, at least in part, on the analysis.

According to another embodiment, an apparatus includes a processor, one or more fiber optic lines for supplying a transmit signal to/from a remote transmission station, and a data acquisition unit for acquiring information from the one or more fiber optic lines. The processor is configured to receive input for selecting one or more fiber optic lines for examination, determine at least one property of the transmit signal to be monitored, and retrieve information corresponding to the at least one property for a predetermined period of time. The processor is further configured to output a visual representation of the retrieved information, perform an analysis of the retrieved information and the visual representation, and facilitate identification of at least one status associated with the transmit signal based, at least in part, on the analysis.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2A is a menu display for configuring the system used in the system of FIG. 1, according to one embodiment;

FIG. 4 is a diagram illustrating response to inline monitoring of a transmission signal in accordance with at least one embodiment;

DETAILED DESCRIPTION

An apparatus and method for inline monitoring of transmit signals, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
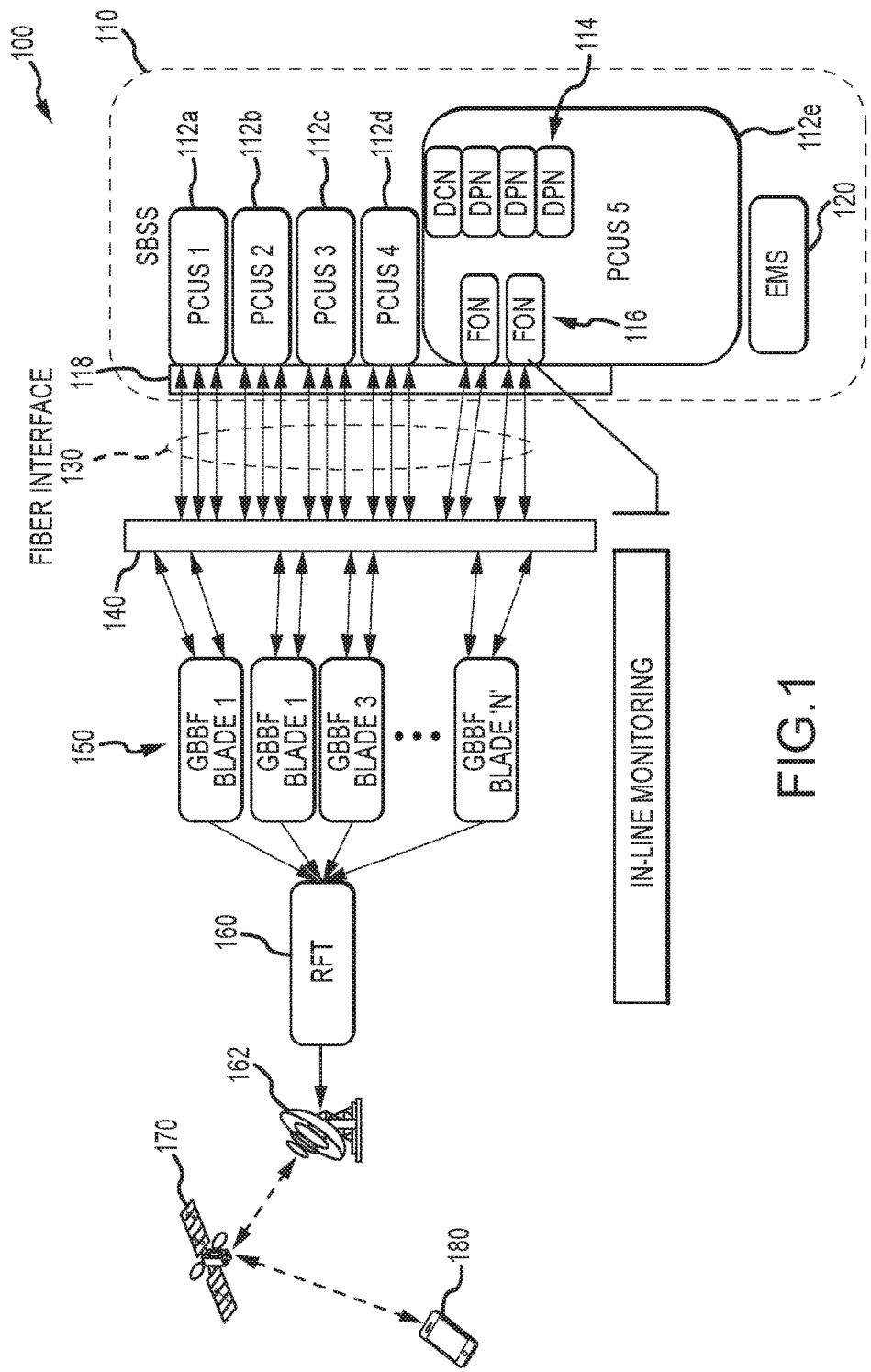
FIG. 1 is a diagram of a system capable of performing inline monitoring of a transmission signal, according to one embodiment.

FIG. 1 is a diagram illustrating a system for inline monitoring of a transmission signal (or transmit signal), in accordance with at least one embodiment. As used herein, the term transmit (or transmission) signal corresponds to any signal (analog and/or digital) containing information such as data, control signals, etc. The data can include, for example, audio, video, speech, image, etc. The transmit signal can be carried over any type of medium including metal-based cables, fiber optic cables, air, etc. Furthermore, the transmit signal can be in either an incoming or outgoing direction. The system 100 includes, for example, a satellite base station subsystem (SBSS) 110, a fiber optic interface 130, and a fiber optic shuffle 140, which facilitate transmission of signals to various components of a satellite communication system. As illustrated in FIG. 1, the SBSS 110 includes a plurality of packet channel unit subsystems (PCUS) 112a, 112b, 112c, 112d, 112e. Although five (5) PCUS 112 are shown, it should be noted that various embodiments can allow for more, or less, depending on various factors including, but not limited to, the number of users, geographical size, etc. According to an embodiment, each PCUS can include a plurality of components used in receiving, processing, and directing communication signals for transmission to and from a satellite 170.

As illustrated in FIG. 1, the fiber optic shuffle 140 provides a connection to multiple blades of a ground based beam former (GBBF) 150. The fiber optic shuffle 140 further interleaves the connections to different blades of the GBBF 150 in order to provide redundancy, for example, in the event of failure in an individual fiber optic line. The GBBF 150 receives and transmits information to and from the fiber optic shuffle 140 and performs various processing before supplying the information to a radio frequency transmitter 160. A radio frequency antenna 162 is used to transmit and receive information to and from a satellite 170 in terrestrial orbit. Additionally, various users may interact with the satellite communication system through user terminals 180 which allow transmission to and from the satellite 170.

As depicted by PCUS_5 112e, such components can include a digital conversion node (DCN) and multiple digital processing notes (DPN), collectively depicted using reference numeral 114. One or more fiber optic nodes (FON) 116 are also provided within the PCUS 112 as a physical layer for connecting the fiber optic cables. According to at least one embodiment, a data acquisition unit 118 can be provided within the SBSS 110 in order to monitor and/or collect information being transmitted across the various fiber optic lines. The data acquisition unit 118 can be configured to passively acquire signal transmissions across the fiber optic lines (i.e., snoop) without interfering with operations of the system. Although FIG. 1 illustrates a single data acquisition unit 118, it should be noted that various embodiments allow for an individual data acquisition unit 118 to be interfaced at the FON 116 of each PCUS 112. Furthermore, various embodiments allow for the FON 116 to be configured for passive data acquisition from each fiber optic line connected thereto. The SBSS 110 further includes an element management subsystem (EMS) 120 which provides an interface for configuring various aspects for an operator to select in connection with inline monitoring of the signals transmitted through the fiber optic lines.

Figure 2A:
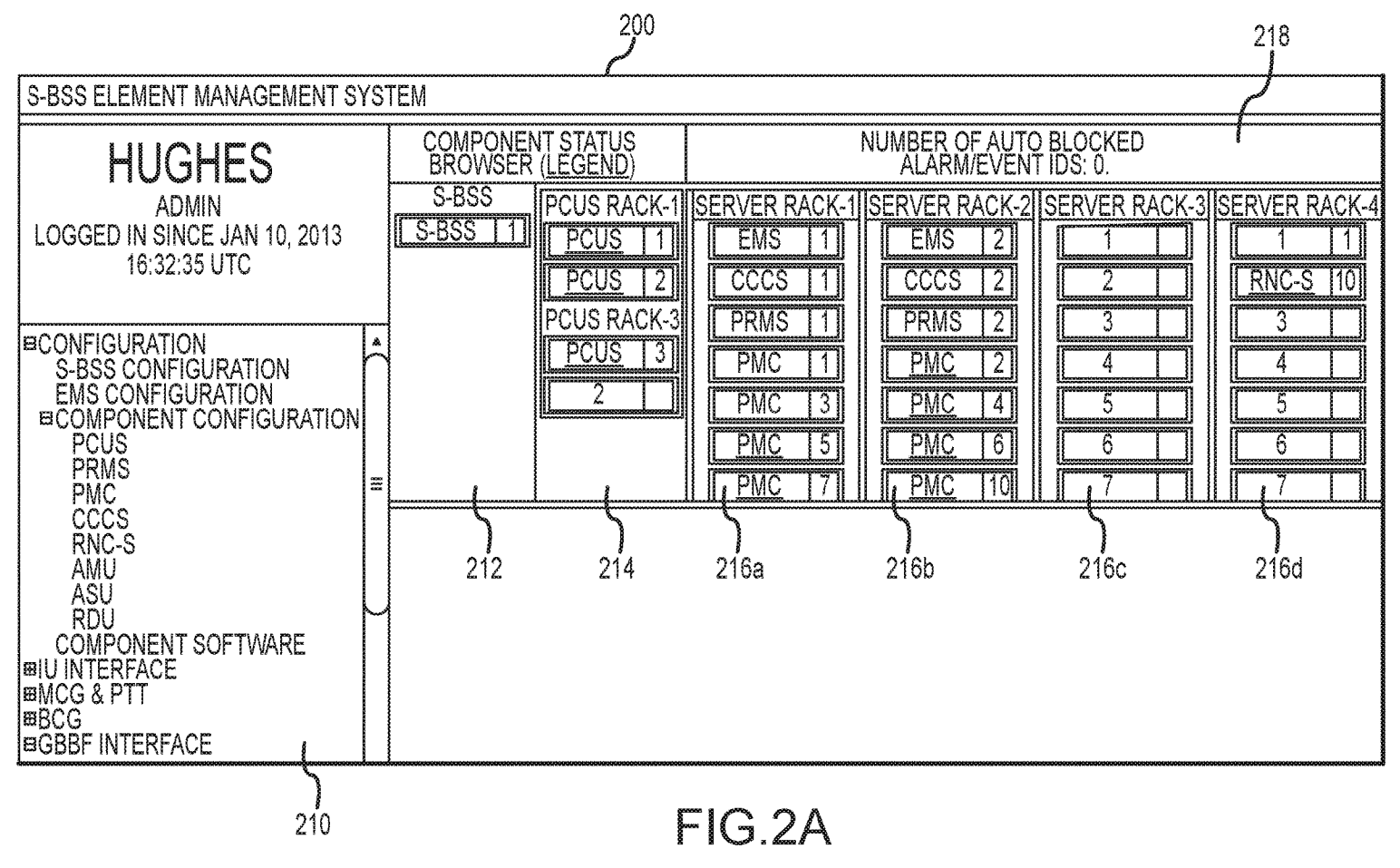

FIG. 2A illustrates a graphical user interface (GUI) 200 accessible through the EMS 120. The GUI 200 allows an operator to view the status of various components with respect to the transmit signals that require monitoring. The operator can use menu 210 to make configuration changes to the SBSS 110 or the EMS 120. Once a selection has been made, menu 212 provides the operator with status (or health) information for the specific SBSS 110 that is being tested, or monitored for potential troubleshooting. Menu 214 provides status information for a particular PCUS 112 within the SBSS 110. Menus 216a-216d further provide status information for different server racks and associated components. The GUI 200 further includes an alert section 218 which provides notification of the number of alerts and/or events that require the operator's attention. The status information provided to the operator can be in the form of an alphanumeric indicator, a visual indicator (e.g., color code), or both.

Figure 2B:
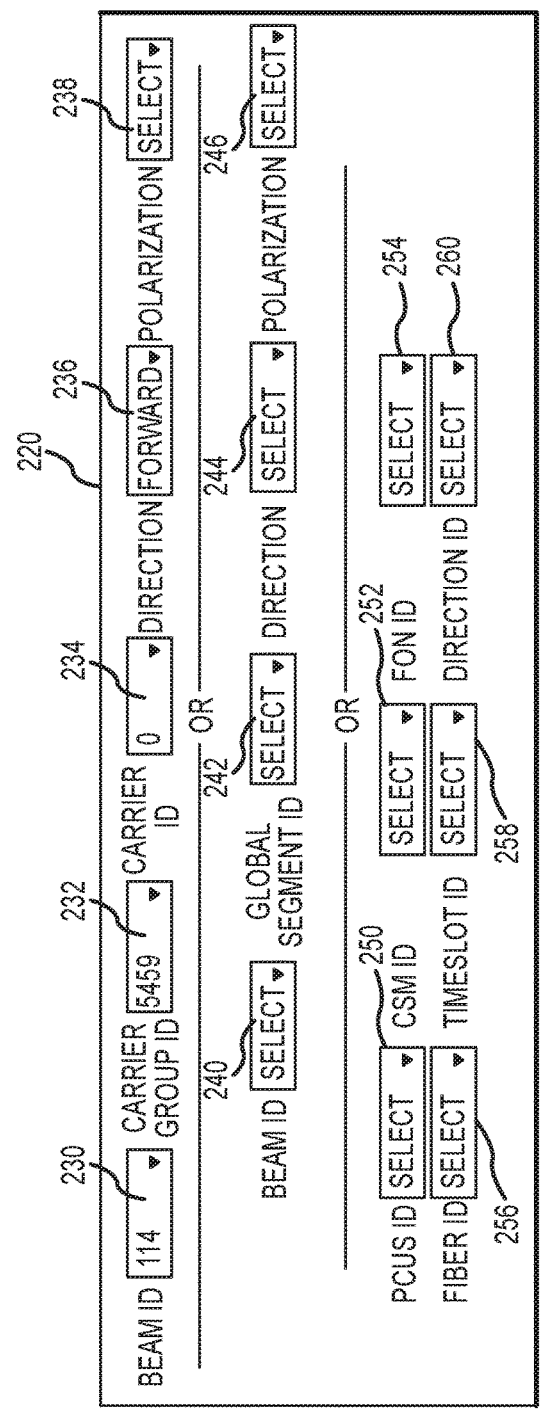
FIG. 2B is a menu display for selecting beamports to be monitored, according to one embodiment.

FIG. 2B illustrates an exemplary menu 220 configured to provide the operator with various options for selecting a desired beamport to monitor. As used herein, the term "beamport" represents a signal that is transmitted across a fiber optic cable and represents the RF waveform that is transmitted/received to/from the satellite. Each fiber optic cable can typically transport multiple beamports by time slicing them across multiple timeslots. The beamport signal can represent, for example, the waveform associated with a single geographic beam at a given center frequency and polarization.

As illustrated in FIG. 2B, for example, the menu 220 can allow the operator to select a beamport by first selecting a particular beam ID from menu 230. The operator then selects a carrier group ID from menu 232 and a carrier ID from menu 234. Menus 236 and 238 allow the operator to select a transmit direction (i.e., incoming or outgoing) and polarization, respectively. Once these parameters have been entered, the EMS 120 can automatically selects the appropriate beamport. According to another option, the operator can select a particular beam ID from menu 240 and a global segment ID from menu 242. Next, the operator selects a direction from menu 244 and polarization from menu 246. The EMS 120 would then select the appropriate beamport. According to yet another option, the operator can select a particular PCUS 112 from menu 250 followed by a common switch module (CSM) from menu 252.

Next, the operator selects a FON 116 within the desired PCUS 112 from menu 254 and a fiber ID from menu 256. The operator can then select a timeslot ID and transmit direction using menus 258 and 260, respectively. The EMS 120 would then select the appropriate beamport. According to various embodiments, the operator can provide a specific carrier number, and the EMS 120 would automatically determine the correct beamport, PCUS 112, FON 116, fiber optic cable, and timeslot. Furthermore, the operator can simply enter the beamport number, and the EMS 120 would automatically determine the correct PCUS 112, FON 116, fiber optic cable, and timeslot. As can be appreciated, the EMS 120 can be configured to allow selection of a desired beamport in various different manners. Accordingly, the foregoing examples are only intended to be illustrative, and not restrictive.

According to one or more embodiments, the operator may further specify a time interval during which transmission signals (or transmit signals) for the beamport will be monitored. Additionally, the operator may specify whether the beamport transmit signal should be monitored along the outgoing or incoming direction. Once the selections are made within the menu, the data acquisition unit 118 performs instantaneous readings at different intervals for the period of time set by the operator. According to various embodiments, the data acquisition unit 118 can also perform instantaneous readings in response to a command or request from the operator. As previously discussed, the FON 116 can also be configured to monitor the beamport transmit signals by performing instantaneous readings at different intervals for the period of time set by the operator.

According to an embodiment, the data acquisition unit 118 performs instantaneous, minimum, and maximum power readings for each individual beamport. The minimum power reading corresponds to the lowest power level measured since the last reporting point, while the maximum power reading corresponds to the highest power level measured since the last reporting point. This can be accomplished, for example, by continually monitoring the input/output power level of each beamport to set minimum and maximum levels. The reporting point corresponds to boundaries of a measurement interval used for selecting minimum and maximum values. For example, if the measurement interval is 5 minutes and the time interval is 30 minutes, then the reporting points for minimum value would occur at minutes 5, 10, 15, 20, 25, and 30. The reporting point at minute 5 represents the lowest power level measured between the start time and minute 5. The reporting point at minute 10 represents the lowest power level measured between minute 5 and minute 10. The reporting point at minute 15 represents the lowest power level measured between minute 10 and minute 15. The reporting points at minutes 20, 25, and 30 would be determined in the same manner. According to further embodiments each fiber optic line is capable of carrying 15 beamports on different time slots. Thus, the data acquisition unit 118 is capable of reading the instantaneous, minimum, and maximum power for all beamports within the optical fiber lines. Upon making a selection using the menu, the readings from the beamport are obtained and stored, for example, within a storage unit (not shown), portable storage device, etc.

According to various embodiments, the operator can select an option to continually monitor all of the beamports within the SBSS 110. The data acquisition unit 118 would therefore take instantaneous, minimum, and maximum power readings within each beamport, and store the information within the storage unit. The information can subsequently be retrieved in the event of a problem or error. For example, the operator can input options to monitor the instantaneous, minimum, and maximum power levels for a period of 30 days, 60 days, 90 days, etc. The information can be stored and maintained for a predetermined amount of time before the storage space is reallocated. Accordingly, in the event of a problem within the communication system, the operator can enter the appropriate dates within the menu and retrieve data corresponding to the instantaneous, minimum, and maximum power readings for the selected time interval.

Figure 3A:
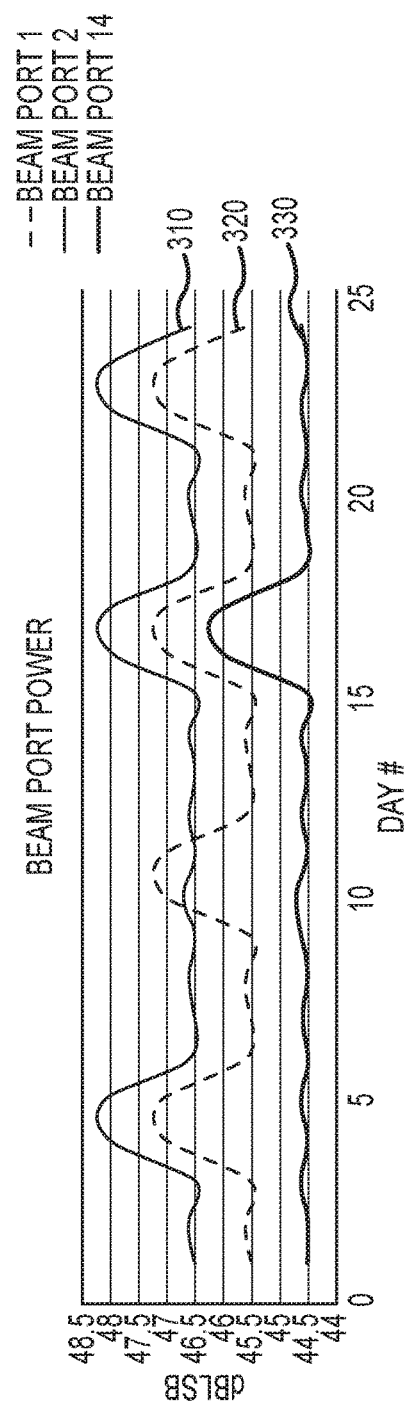
FIG. 3A is a signal obtained when monitoring power input/output, according to one embodiment.

FIG. 3A illustrates an exemplary signal output corresponding to the output power levels of beamports, in accordance with at least one embodiment. FIG. 3A illustrates a condition where the operator has selected to monitor beamport 1, beamport 2, and beamport 14. Furthermore, the operator has selected to monitor the power levels for a period of 25 days. According to an embodiment, the EMS 120 retrieves information corresponding to the power measurements for each of the selected beamports, and generates a visual representation of the retrieved information. According to the embodiment illustrated in FIG. 3A, the visual representation is in the form of a graph illustrating power density relative to time. As illustrated in FIG. 3A, beamport 1 goes through various cycles where the output power level rises from 45.5 up to 47.2, and falls back to about 45.5. This occurs over a three-day period. Then, over the next 3 days, the power remains relatively level at about 45.5. This cycle repeats a total of 4 times during the selected 25 day interval.

Beamport 2 displays a similar rise/fall in power, but from 46.5 to about 48.2, and back to 46.5. After the initial rise/fall in output power, however, the power level remains relatively constant at about 46.5 for a period of 10 days. Then, two additional fluctuations occur which coincide with the output power of beamport 1. Beamport 14 illustrates a relatively constant power level of 44.5 for the first 15 days. A power fluctuation then occurs which coincides with that of beamports 1 and 2. In this situation, the output power of beamport 14 rises to 46.2 and returns to 44.5 over a three-day period. The power level then remains constant at 44.5 for the remaining days. Accordingly, by examining the output power of the selected beamports, the operator is capable of performing some analyses to identify potential problems with the system.

For example, if the output power from beamport 1 exhibited a significant drop in power level over a period of time, the operator can attribute that loss of power to communication loss within a particular beam coverage during the corresponding time period. For example, if a user indicates an inability to access the communication network for the same time interval, the operator can attribute such a problem to the loss of output power from beamport1. Depending on whether the graph displays transmit or receive output power, the operator can perform further testing and analysis of physical system components.

According to an embodiment, if the loss of power occurs in the outgoing direction (to the satellite), then the operator can check systems associated with the SBSS 110. Alternatively, if the loss of power occurs on the receive signal, this can be an indication of problems associated with the GBBF 150, or other components outside of the SBSS 110. Depending on the operator's access to system components, further troubleshooting can be performed either locally at the SBSS 110 or externally at the GBBS 150. Furthermore, intermediate subsystems, such is the fiber interface 130 and fiber optic shuffle 140, can be tested in order to isolate the source of the problem.

Figure 3B:
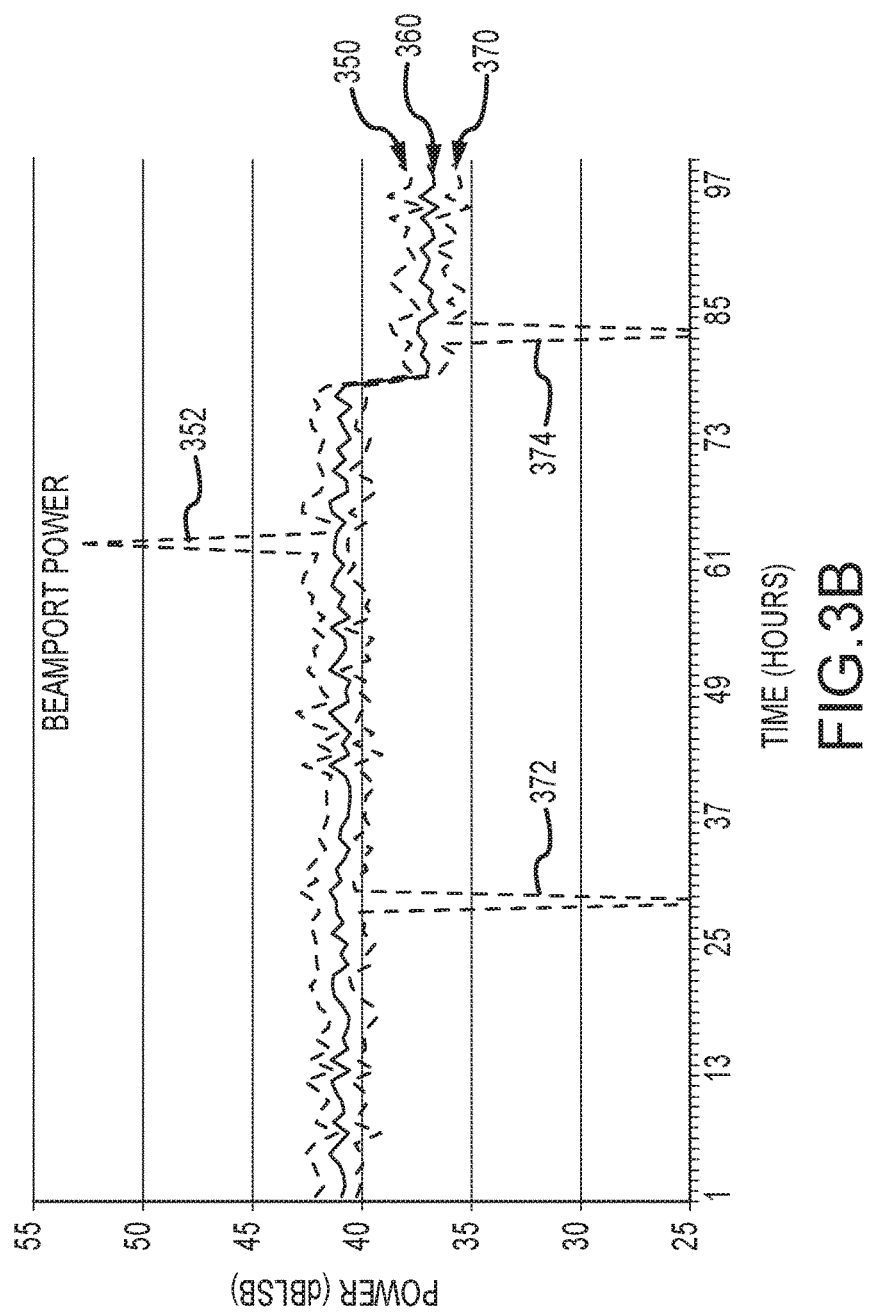
FIG. 3B is a graph illustrating output power levels of a selected beamport, according to one embodiment.

FIG. 3B illustrates exemplary output power levels of a beamport, in accordance with an embodiment. According to the illustrated embodiment, the output power levels have been retrieved for a period of ninety seven (97) days. Reference numerals 350 and 370 identify plots corresponding measurements of the maximum and minimum power readings, respectively, for the selected beamport. Such measurements can be obtained, for example, by continually monitoring the output power level of the selected beamport and storing the maximum and minimum values within a desired interval. Accordingly, for a 1 day interval, the maximum and minimum output power levels for each day would be stored. The resulting 97 values for maximum output power would be used to generate plot 350, while the resulting 97 values for minimum output power would be used to generate plot 370. As illustrated in FIG. 3B a significant rise in output power occurs at 352, and two significant decreases in power occur at 372 and 374. According to at least one embodiment, an operator can quickly identify such changes in the minimum and maximum power levels and perform any necessary diagnosis to isolate and/or identify the cause of such changes. As can be appreciated, the operator may utilize any desired interval such as seconds, minutes, hours, etc.

Reference numeral 360 identifies a plot of the instantaneous power measurements. According to one or more embodiments, the operator can specify a measurement interval for obtaining the instantaneous output power of the selected beamport, or apply a command to request measurement of the instantaneous output power of the beamport. Measurements would be recorded at each discrete reporting point for generating plot 360. For example, if the measurement interval is 10 minutes, then output power measurements would be recorded at minutes 10, 20, 30, 40, etc., in the manner previously described. As can be appreciated, the instantaneous measurement may not always correspond to a maximum or minimum output power. According to the illustrated embodiment, however, significant increases or decreases in output power within the entire time period can be identified by monitoring the maximum and minimum output power levels as previously described. Thus, an operator can easily identify when such output power levels occur.

FIG. 4 is a diagram illustrating a response to inline monitoring of a transmit signal in accordance with an embodiment. During signal transmission to the satellite 170, it is often necessary to monitor the power level within the transmit signals in order to prevent excessive power which can potentially damage the satellite 170, or other components/subsystems located downstream of the SBSS 110. Although the power being transmitted is generally calculated such that it is within the levels specified by a system frequency plan, malfunctions can cause spikes in power that can potentially damage the satellite 170 if transmitted.

According to an embodiment, the EMS 120 can be customized through the GUI 200 to continuously monitor the transmit power level in each beamport in order to prevent transmission at a power level which exceeds the parameters of the satellite 170. The operator can select a threshold power level which should not be exceeded by any individual beamport. According to one or more embodiments, the operator can set different threshold power levels for each individual beamport. According to further embodiments, the operator can group a plurality of beamports and set the threshold power level for the group. Thus, the instantaneous output power of each beamport can be continually monitored, and the associated information stored in a storage system. If the transmit power exceeds the predetermined threshold, however, signal transmission within the selected beamport is automatically squelched. More particularly, the transmit signal is automatically discontinued. According to an embodiment, the contents of the transmit signal can be replaced with a stream of zeros, thus resulting in no transmit power within the beamport. Information regarding power output for the selected beamport can subsequently be accessed by the operator for further analysis.

Referring again to FIG. 4, the information can be presented to the operator in the form of a graph illustrating the power level relative to sample number. As illustrated in FIG. 4, the operator has set a threshold power 410 at a value of 5000 for beamport 0. During time interval t1, the output power of beamport 0 remains below the threshold 410. As the samples are transmitted, however, the output power exceeds the threshold level 410. The transmit signal is automatically terminated without any input from the operator. This is done, for example, in order to prevent potential damage to the satellite 170.

As further illustrated in FIG. 4, the transmit signal is replaced with a stream of zeros instead of the actual samples. According to at least one embodiment, the EMS 120 will cause the stream of zeros to be continually transmitted until reset by the operator. According to further embodiments, an alert may be triggered in order to solicit immediate attention from the operator. According to one or more embodiments, the operator may be presented with a list of beamports which triggered this particular alert. The operator can then access the necessary files and review the graphs in order to determine when the problem occurred. Furthermore, since the signal is being transmitted to the satellite 170, various components within the SBSS 110 can be tested and evaluated in order to ensure proper performance.

As previously discussed, various embodiments allow for automatic squelching of the transmit signal if the transmit power exceeds the predetermined threshold level. Thus, no actual operator intervention is required to prevent potential damage to the satellite 170 resulting from an increase in transmit power. Furthermore, various embodiments allow the transmit power of all beamports to be continually monitored in order to prevent excess power. The graph illustrated in FIG. 4 would therefore only be presented to the operator after an alarm has been triggered. Alternatively, an operator can select an option to review the data and graph without an alarm having been triggered.

According to an embodiment, the GUI 200 can provide options to monitor the content of incoming and outgoing transmit signals for any selected beamport. According to such an embodiment, the operator can identify the beamport to be monitored, as well as either a time period, a number of samples, or a number of TDMA frames. In response, the FON 116 collects the samples and supplies them to the EMS 120. In order to facilitate analysis of the information by the operator, the EMS 120 converts the information collected for the samples to a frequency domain, and generates a spectral analysis plot of the power density relative to the carrier frequency. This allows the operator to perform a visual inspection of various aspects related to the carriers. For example, the operator can quickly identify the presence or absence of a particular carrier. Additionally, the operator can examine burst transmissions in order to ensure that burst type and placement conform to predetermined plans and/or guidelines. According to at least one embodiment, the FON 116 can be configured to convert the information collected for the samples to a frequency domain and generate the spectral analysis plot.

Figure 5A:
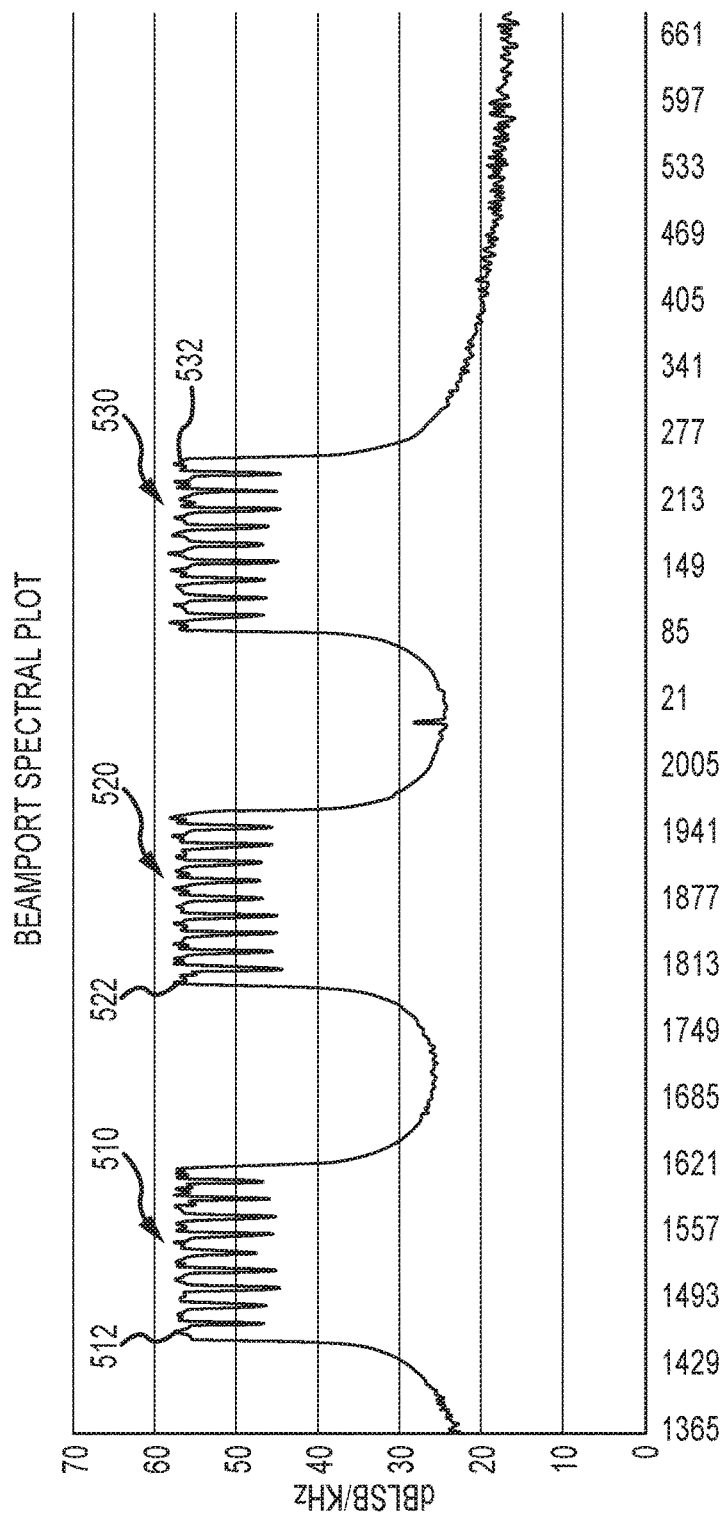
FIG. 5A is a diagram illustrating an output generated in response to inline monitoring of a transmission signal content, in accordance with an embodiment.

FIG. 5A illustrates an exemplary spectral plot for a selected beamport, in accordance with at least one embodiment. The plot illustrates the results of 30 carriers at different frequencies transmitting back to back (m, n) bursts, where m is a frequency multiplier which is currently set=1, and n is the burst length in slots which is currently set=6.

Due to the particular frequency allocation, the carriers are clustered together in three energy groups. Specifically, a first energy group 510 contains ten (10) carriers 512, a second energy group 520 contains ten (10) carriers 522, and a third energy group 530 contains ten (10) carriers 532. Within the context of FIG. 5A, back to back bursts indicate that the bursts are transmitted immediately after one another.

According to an embodiment, the GUI 200 menu allows a user to select an option to review and analyze, for example, information pertaining to the data being transmitted or received at a selected beamport. According to such an embodiment, the FON 116 (or alternatively the data acquisition unit 118) would collect data corresponding to samples over a predetermined period of time. As previously discussed, the data can be collected for the incoming signal, the outgoing signal, or both. As the signal is being collected, it can be stored within the storage unit, or maintained in a buffer until the collection interval has expired. The data can then be sent to the EMS 130 to facilitate analysis by the operator.

Figure 5B:
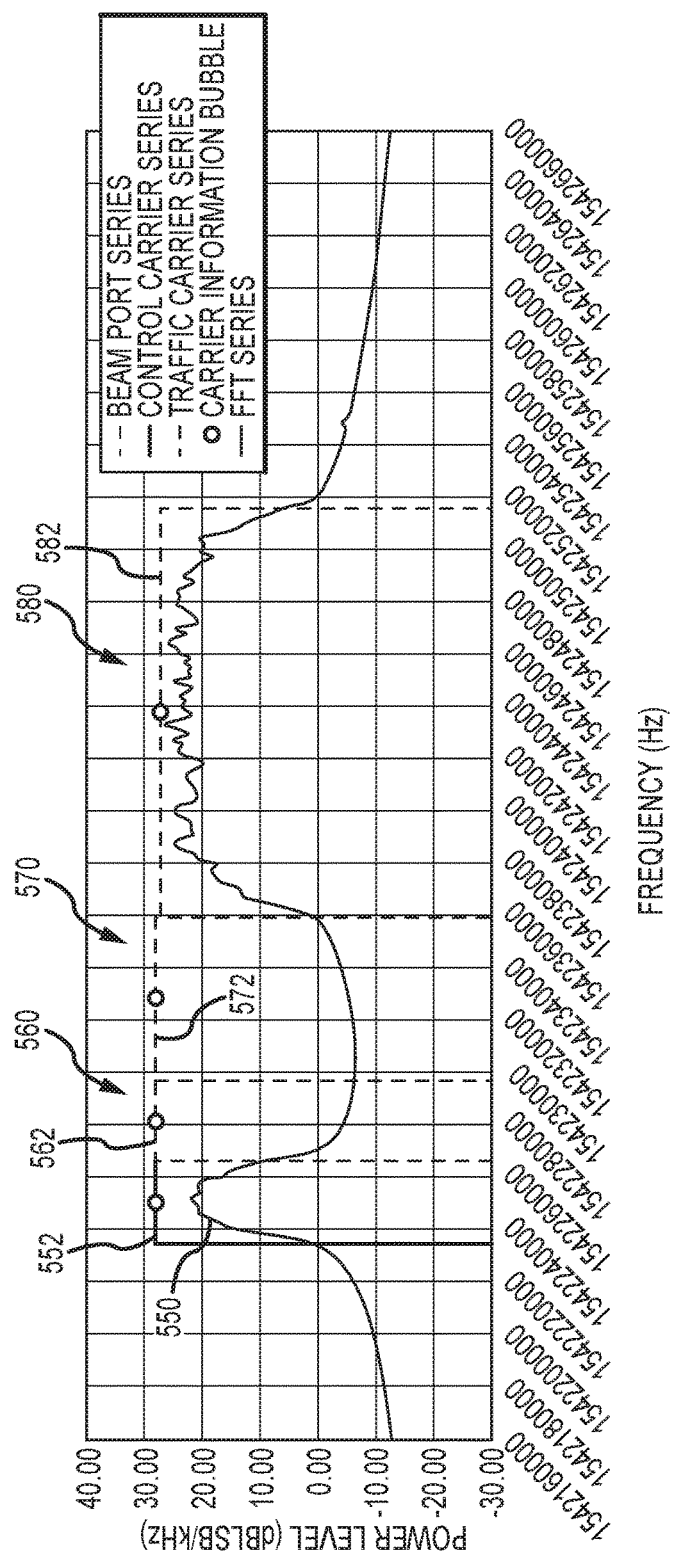
FIG. 5B is a diagram illustrating an output generated in response to inline monitoring of a transmission signal content, in accordance with another embodiment.

FIG. 5B illustrates an exemplary spectral plot for a selected beamport in accordance with another embodiment. According to at least one embodiment, the operator can select an option to generate a carrier overlay in conjunction with the spectral plot. The spectral plot of FIG. 5B contains signals representing a control carrier 550 and three traffic carriers 560, 570, 580. Upon selecting the overlay option, a control carrier overlay 552 can be generated to identify the expected position of the control carrier 550. As illustrated in FIG. 5B, the control carrier 550 is well formed and located within the expected position, as depicted by the control carrier overlay 552. Similarly, the third traffic carrier 580 appears to be well formed and located within its expected position, as depicted by the third traffic carrier overlay 582.

The first traffic carrier overlay 562 and the second traffic carrier overlay 572 represent the location of the first traffic carrier 550 and the second traffic carrier 560, respectively. As illustrated in the figure, however, the first and second traffic carriers 560, 570 appear to be absent from the signal. The carrier overlays, therefore, allow the operator to quickly perform a visual examination of the transmit signal and conclude that the first traffic carrier 560 and the second traffic are 570 are not present in the signal. The operator can utilize this information to perform necessary diagnostic tests which can isolate and/or identify the cause of these traffic carriers being absent from the signal.

Figure 6:
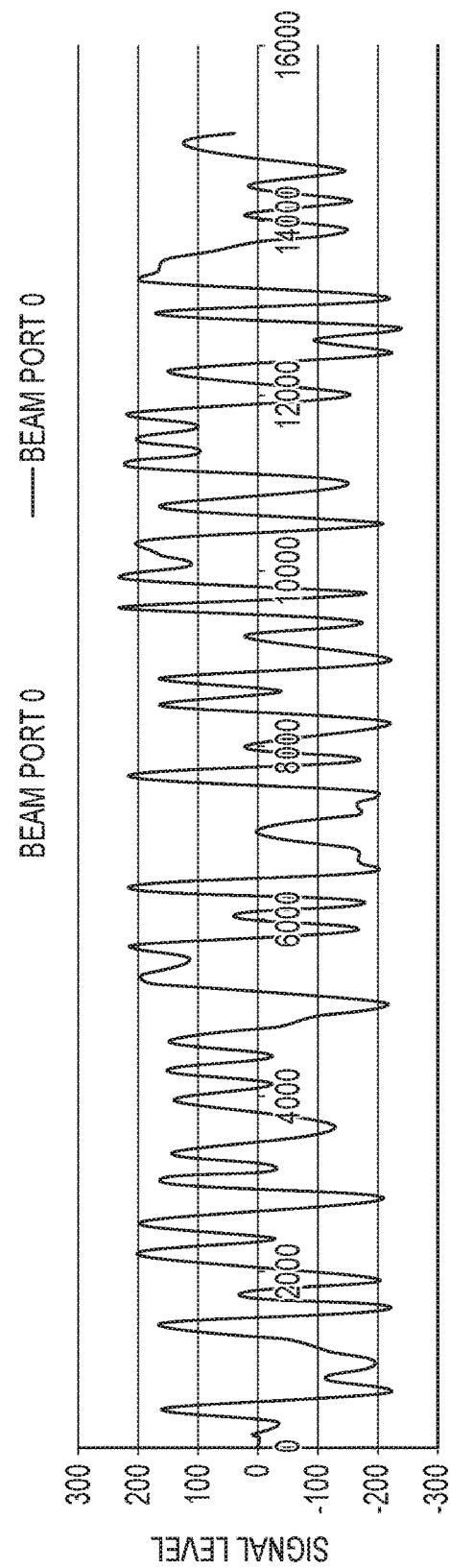
FIG. 6 is a diagram illustrating an output generated in response to inline monitoring of data in a transmission signal, according to at least one embodiment.

FIG. 6 illustrates a visual representation of an output, or display, generated over time, in accordance with at least one embodiment. The visual representation is presented in the form of a modulated carrier signal corresponding to the collected data. The operator is capable of providing a visual inspection in order to identify any information which can suggest, for example, a loss of user data. Additionally, the operator can perform further processing in order to analyze the modulated carrier signal.

According to at least one embodiment, a theoretical representation of the modulated carrier signal can be generated off-line. For example, information corresponding to the transmit signal can be utilized to compute a theoretical modulated carrier signal. The theoretical modulated carrier signal can then be compared with the actual modulated carrier signal in order to determine if the error occurs, for example, at a modulator contained within the SBSS 110. However, if the signals are different, then the operator can examine other components in order to isolate the source of the error. According to at least one embodiment, the modulated carrier signal obtained from the beamport can be demodulated off-line using simulation software. Once the signal has been demodulated, the contents can be examined in order to determine, or isolate, the source of any potential errors.

Figure 7:
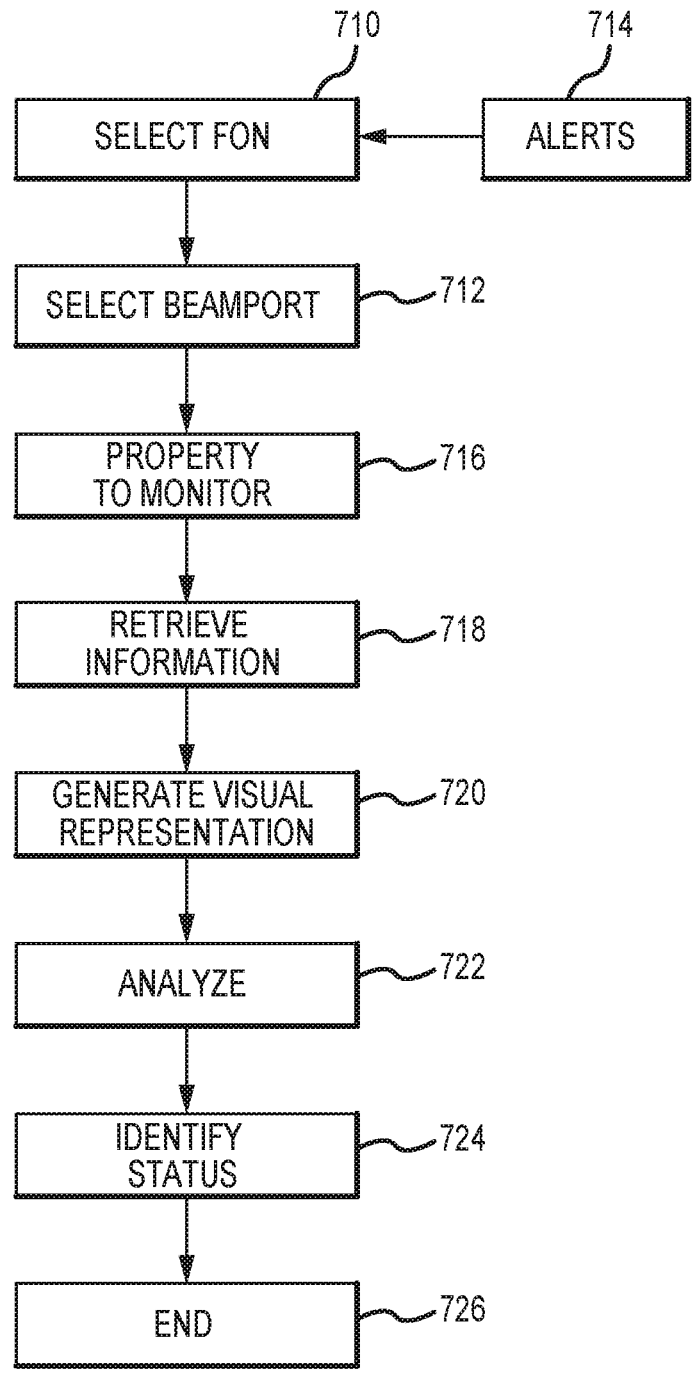
FIG. 7 is a flowchart illustrating a process for inline monitoring of a transmission signal, according to one embodiment.

FIG. 7 is a flowchart illustrating a process for inline monitoring of a transmission (or transmit) signal, in accordance with at least one embodiment. At 710, a particular FON is entered through the GUI. At 712, a particular beamport is selected. As previously discussed, each FON contains multiple fiber optic cables which carry transmit signals to and from a remote transmission station. Furthermore, each fiber optic cable can carry multiple beamports each on a different timeslot. Thus, at 712, the beamport can be selected in accordance with any of the previously described manners. According to at least one embodiment, the specific FON and beamport can be selected based on alerts received in advance. This is indicated at 714 according to such embodiments, the alerts would be reviewed in order to identify a particular FON, fiber optic line, etc. having a current alert that has been triggered.

At 716, a particular property to be monitored is determined. This can correspond, for example, to the signal level, signal content, power level, etc. At 718, information corresponding to the property being monitored is retrieved. This corresponds for example, to accessing the storage unit in order to retrieve a file containing the data that has been collected. Alternatively, the data can be collected in real time and supplied directly for analysis. At 720, a visual representation is generated. This can correspond, for example, to the creation of various graphs, plots, etc., which facilitate visual inspection and analysis of the information collected. At 722, the visual representation of the retrieved information can be analyzed in order to identify potential system errors and/or isolate the location where the error may have occurred. At 724, a status can be identified. For example, such a status can indicate the analysis has concluded that no errors have been found within the monitored property. Alternatively, the status can indicate that an error exists, and/or can be isolated to a local system, a remote system, and intermediate system, etc. The process ends at 726.

Figure 8A:
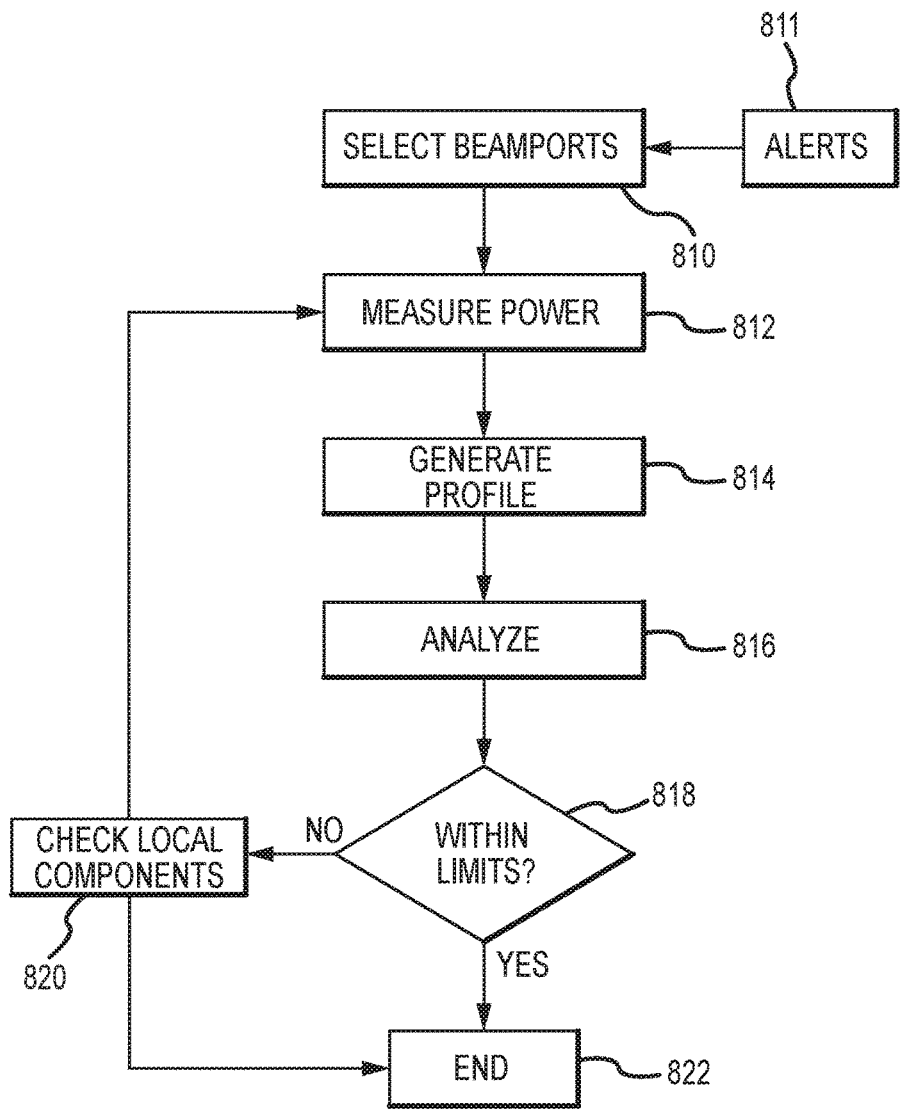
FIG. 8A is a flowchart of a process for monitoring power input/output, according to one embodiment.

FIG. 8A is a flowchart illustrating a process for monitoring power output, in accordance with at least one embodiment. At 810, the beamports to be monitored are selected. This can be initiated, for example, in response to an alert, as indicated at 811. At 812, the power levels within the selected beamports are measured. As previously discussed, this can include measurement of the instantaneous, minimum, and maximum power levels within the selected beamports. At 814, a profile of the output power is generated. As previously discussed, this can be in the form of a graph showing power over time. Furthermore, multiple beamports can be illustrated within the same graph. At 816, a visual inspection is performed in order to analyze the profile that has been produced. The visual inspection can indicate, for example, whether a loss of power occurred, or whether the transmit power was inconsistent. At 818, it is determined whether the power profile is within acceptable limits. If it is determined that the power profile is not within acceptable limits, then various local components can be tested at 820. The process can end at this point, or optionally return to 812 in order to measure the power. This can be done, for example, to confirm the fault has been resolved or if no fault was discovered from testing the components. Alternatively, if the power profile is within acceptable limits, then the process ends at 822.

Figure 8B:
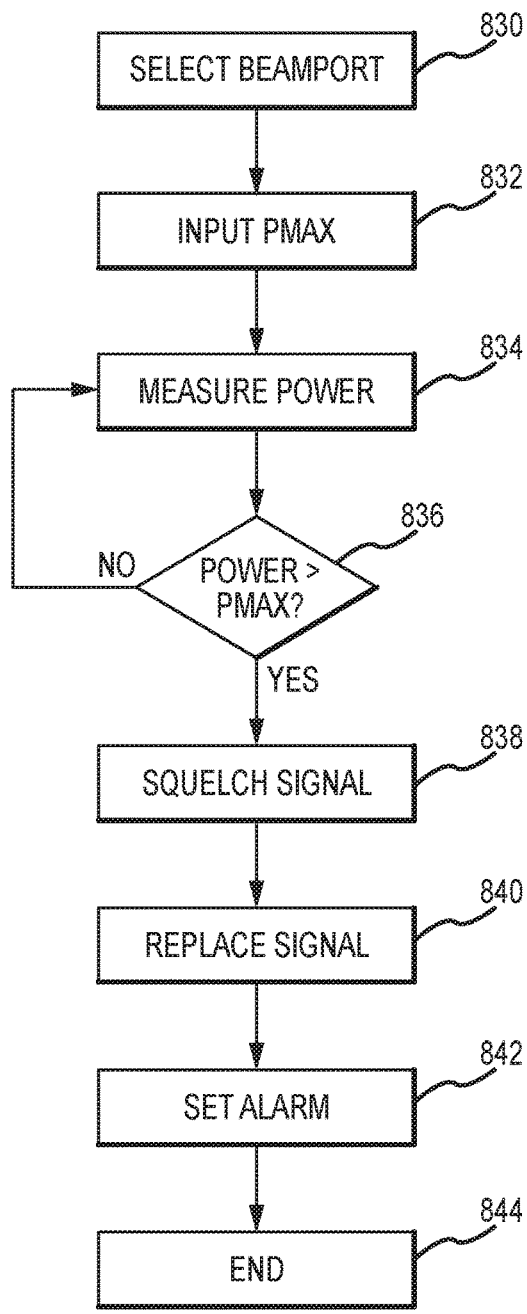
FIG. 8B is flowchart illustrating a process for responding to inline monitoring of a transmission signal in accordance with at least one embodiment.

FIG. 8B is a flowchart illustrating a process for responding to inline monitoring of a transmit signal, in accordance with one embodiment. At 830, a desired beamport is selected. According to various embodiments, rather than selecting an individual beamport, it is possible to select multiple beamports to be monitored. At 832, a maximum power threshold is entered. This can correspond to, for example, a maximum safe power level for sending transmit signals to the satellite over an extended period of time. According to at least one embodiment, a maximum power threshold can be entered for each individual beamport. According to further embodiments, multiple beamports can be grouped and a maximum power threshold entered for the group. It should be noted that throughout the process illustrated in FIG. 8B, the system may be operating under normal conditions (i.e., passing normal communication traffic and providing user services). Certain embodiments, however, can allow interruption and/or stoppage of traffic during steps 830 and 832, and resume after the maximum power threshold has been entered.

At 834, the instantaneous power within the selected beamport (or beamports) is measured. At 836, it is determined whether the measured power exceeds the maximum power threshold. If the maximum power threshold has not been exceeded, control returns to 834, were the instantaneous power is again measured. This cycle can continue repeatedly over time as long as the power level remains below the maximum power threshold. If the instantaneous power measured exceeds the maximum power threshold, however, then the transmit signal for the corresponding beamport is squelched. For example, transmission is automatically terminated for the particular beamport.

At 840, the transmit signal is replaced with a stream of zero. As previously discussed, transmission of a stream of zero values results in zero transmit power levels. Furthermore, the stream of zeros can be transmitted until being manually reset. At 842, an alarm is triggered. The alarm can be in the form of a visual and/or audio alert. Furthermore, the alarm can cause predetermined messages to be transmitted to appropriate personnel to examine the system. The process then ends at 844. As previously discussed, multiple beamports can be selected. Thus, if the power level only exceeds the maximum power threshold for one beamport, then the alert and squelch only apply to that particular beamport. The system would therefore continue monitoring the instantaneous power levels at the remaining beamports in order to prevent the transmit signal from being supplied to the satellite at unsafe levels. As previously discussed, various embodiments allow for monitoring of individual beamports, groups of beamports, or all beamports. Accordingly, if an alarm is set for a particular beamport, the remaining beamports continue to be monitored. An additional alarm can further be set in the event that a different beamport (or group of beamports) experiences a condition where the maximum power threshold is exceeded.

Figure 8C:
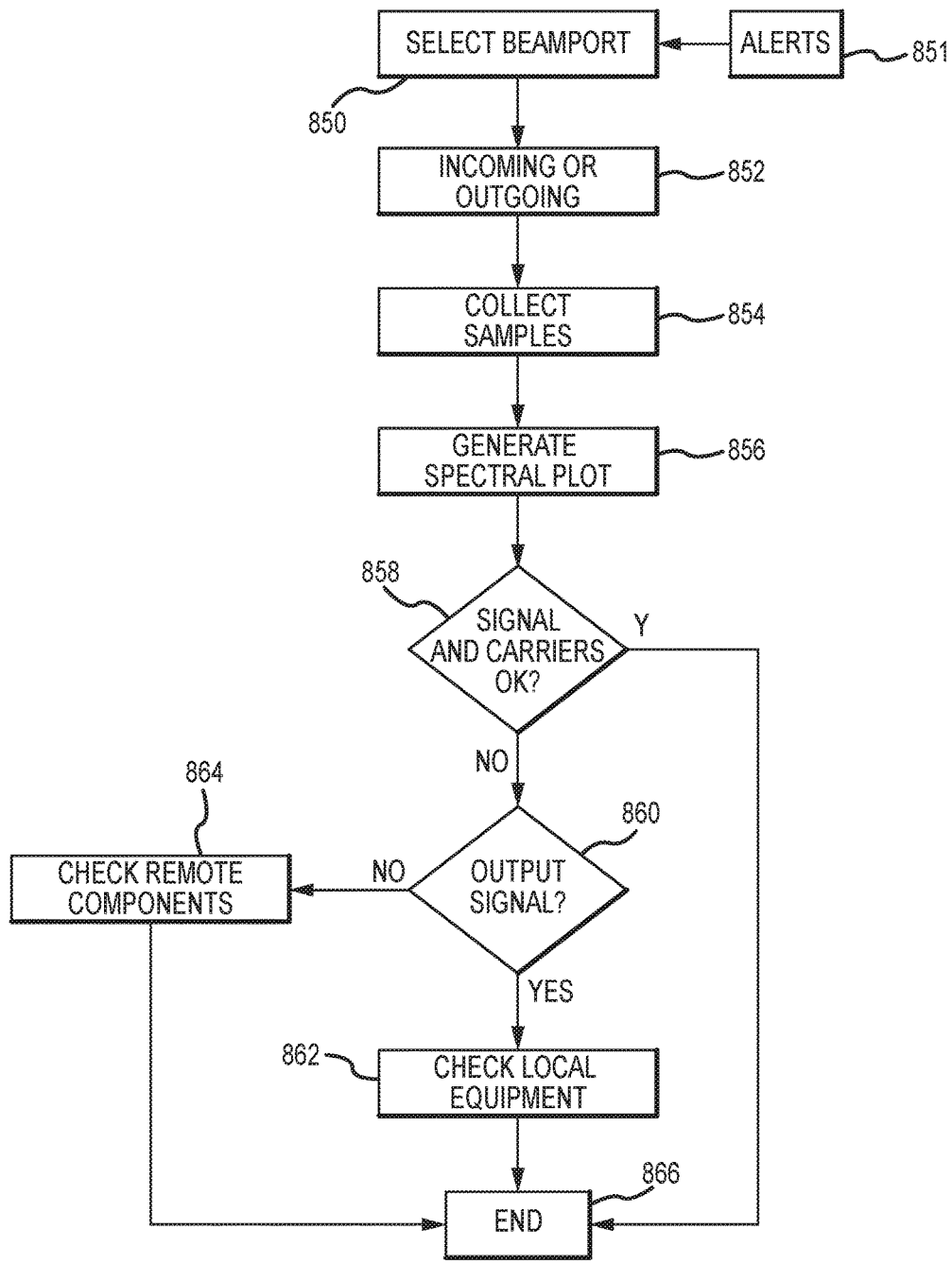
FIG. 8C is flowchart illustrating a process for responding to inline monitoring of a transmission signal content, in accordance with at least one embodiment.

FIG. 8C is flowchart illustrating a process for responding to inline monitoring of a transmit signal content, in accordance with at least one embodiment. At 850, a beamport is selected for monitoring. This can be initiated, for example, in response to an alert, as indicated at 851. It 852, a selection can be made to monitor the transmit signal being output or received through the beamport. At 854, the samples are collected for a predetermined length of time, or until a predetermined number of samples have been acquired. According to one or more embodiments, the number of samples collected, or the amount of time for which the samples are collected can be supplied to the EMS.

At 856, a spectral analysis plot is generated for the transmit signal associated with the selected beamport. At 858, it is determined whether the carrier information contained within the spectral analysis plot is accurate. According to one or more embodiments, this can be done by determining the presence/absence of particular carriers, location of the carriers, power level of carriers, shape and bandwidth of carriers, etc. If the carrier information is not accurate, then at 860, it is determined whether the transmit signal is being supplied to the satellite (i.e., outgoing to the satellite). If the transmit signal is being supplied to the satellite, then at 862 local equipment is tested in order to determine and/or isolate the source of the error. If the transmit signal is not being supplied to the satellite (i.e., incoming or received from the satellite), however, then at 862, remote components can be tested in order to identify and/or isolate the source of the error. The process ends at 866.

Figure 8D:
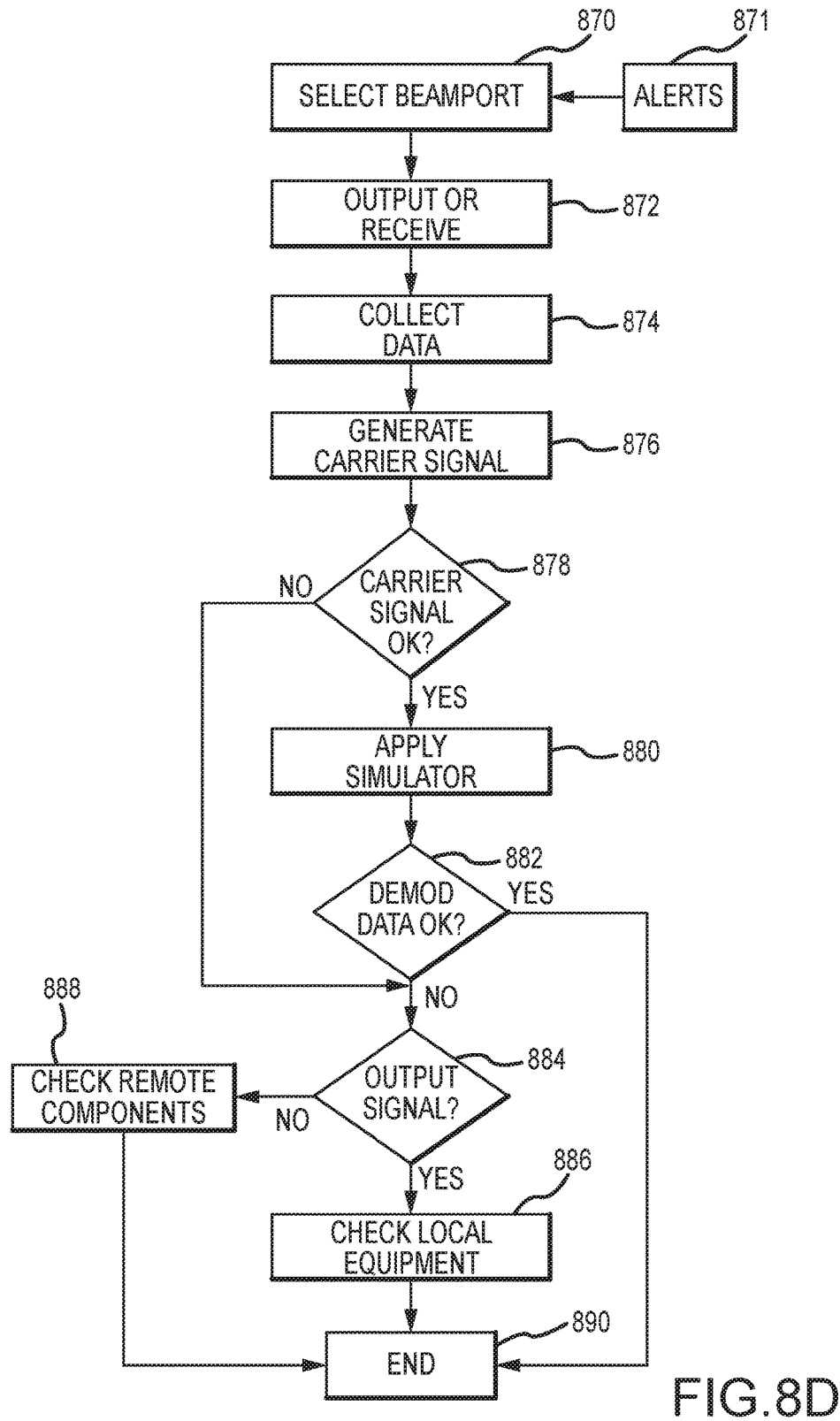
FIG. 8D is flowchart illustrating a process for inline monitoring of data in a transmission signal, according to at least one embodiment.

FIG. 8D is flowchart illustrating a process for inline monitoring of data in a transmit signal, according to at least one embodiment. At 870, a desired beamport is selected. This can be initiated, for example, in response to an alert, as indicated at 871. At 872, it is determined whether the transmit signal is outgoing to the satellite or incoming from the satellite. At 874, data is collected from the selected beamport. At 876, a modulated carrier signal is generated from the collected data. At 878, it is determined whether the carrier signal appears as expected. This can be done, for example, through visual inspection of the carrier signal to determine continuity or discrepancies. If the carrier modulated signal does not appear as expected, then control passes to 884. If the carrier signal appears as expected, then a simulator is applied at 880. According to at least one embodiment, the simulator can correspond to numerical analysis software suitable for testing engineering and scientific principles. Such simulators include, but are not limited to, MATLAB, Simulink, Simscape, etc. According to further embodiments, the algorithms used to modulate and demodulate the transmit signals can be provided within the simulator in order to perform off-line demodulation of the modulated carrier signal.

At 880, the demodulated signal from the simulator analyzed in order to determine, for example, if the content appears to be consistent with the data expected from the modulated carrier signal. According to one or more embodiments, such analysis can be performed, at least in part, using the simulator. If the demodulated signal is determined to be as expected, then control passes to 890 where the process ends. If errors (i.e., discrepancies) are detected from the demodulated signal, then at 884, it is determined whether the transmit signal is being supplied to the satellite. If the transmit signal is being supplied (or outgoing) to the satellite, then additional tests can be performed on components within the SBSS at 886 in order to determine, or isolate, the cause of the discrepancy. If the transmit signal is not being supplied to the satellite (i.e., not outgoing to the satellite), however, then at 884, remote equipment can be tested. The process ends at 890.

Figure 9:
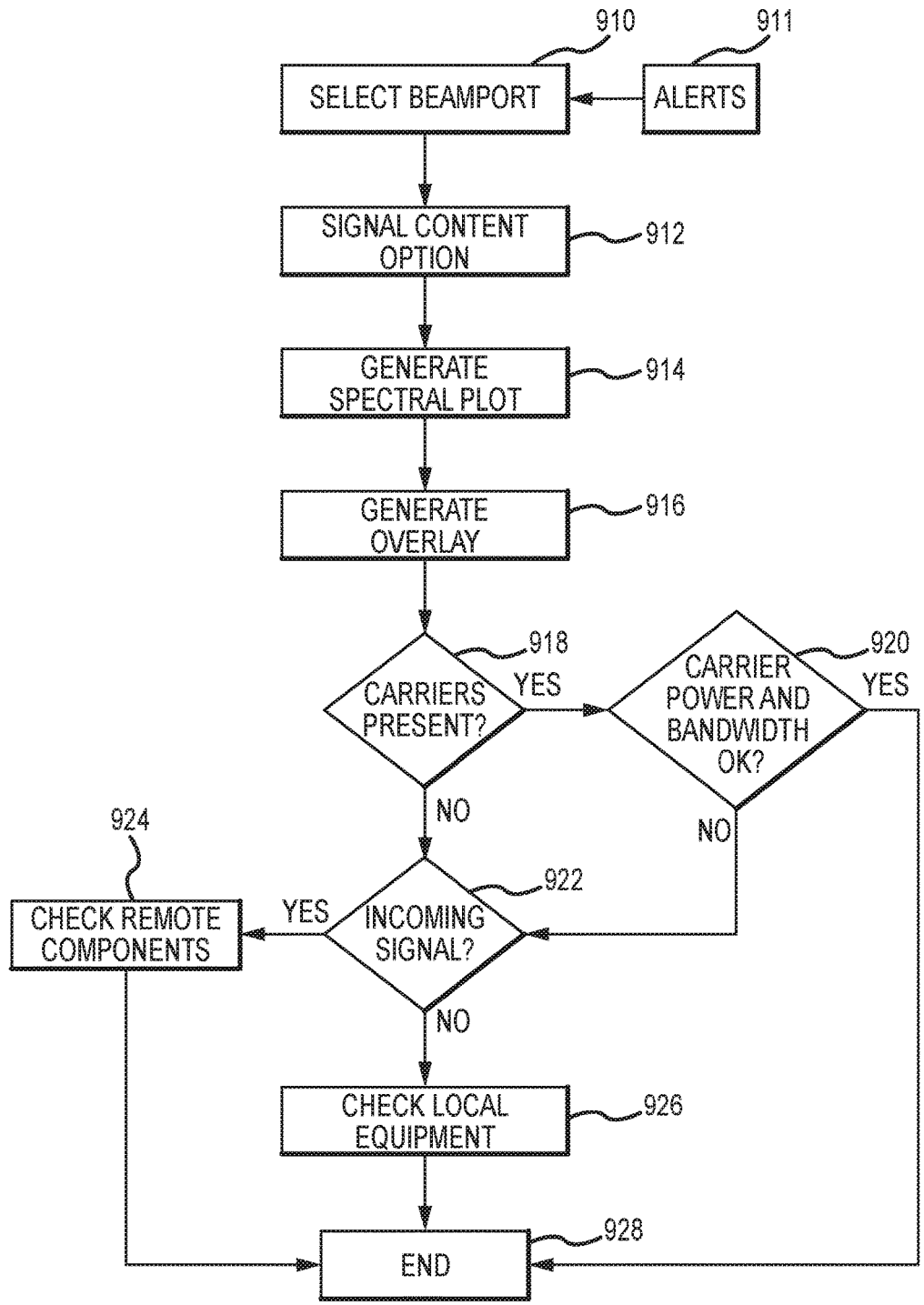
FIG. 9 is flowchart illustrating a process for isolating a problem user terminals, according to at least one embodiment.

FIG. 9 is flowchart illustrating a process for isolating a problem with user terminals, according to at least one embodiment. During normal operations, situations can occur wherein a user terminal is unable to lock onto control carriers that are transmitted by the SBSS. Most likely, the signal is either absent or corrupted in some way. Various embodiments can allow an operator to determine if the problem is already present at the SBSS output or if it gets introduced at some point further down the chain such as, for example, a remote transmission station (e.g., the GBBF) or intermediate component (e.g., fiber optic shuffle). In particular, FIG. 9 illustrates a process for isolating such a problem.

At 910, a desired beamport is selected, and information is collected. As previously discussed, the beamport can be selected in various ways, including number, timeslot, etc. According to various embodiments, the process can optionally be initiated in response to an alert, as indicated at 911. At 912, the property to be monitored is selected as the signal content. This can correspond, for example, to selecting an option to produce a spectral energy plot. At 914, the spectral energy plot is generated and presented. At 916, a carrier overlay is generated and displayed on the spectral energy plot. According to at least one embodiment, the carrier overlay can be generated simultaneously with the spectral plot at 914. At 918, the spectral energy plot is analyzed in order to determine if any signals are present. If carrier signals are present, then control passes to 920, where it is determined whether the carrier signals are well-formed within the correct bandwidth and power. According to an embodiment, this allows for a visual assessment as to whether or not the carrier signals are well formed and within the outlined bandwidth. If the carriers are well-formed and within the correct bandwidth and power, then the process ends at 928.

If no carriers are present (918), or if carriers are present but are not well formed and within the outlined bandwidth (920), then control passes to 922, where it is determined whether the transmit signal is incoming, i.e., being received from the satellite. If the transmit signal is incoming, then control passes to 924. According to one or more embodiments, any resulting faults are presumed to be the result of a malfunction at a remote station or an intermediate component. Accordingly, various remote components can be checked at 924. If the transmit signal is not incoming, then control passes to 926, where local components can be tested. Such tests can determine, for example, whether problems exist in the formation of bursts and/or carriers. According to an embodiment, such an error can be attributed to improper beamport processing. Thus, the components responsible for processing the beamport signal can be further examined and tested at 926. The process ends at 928.

Figure 10:
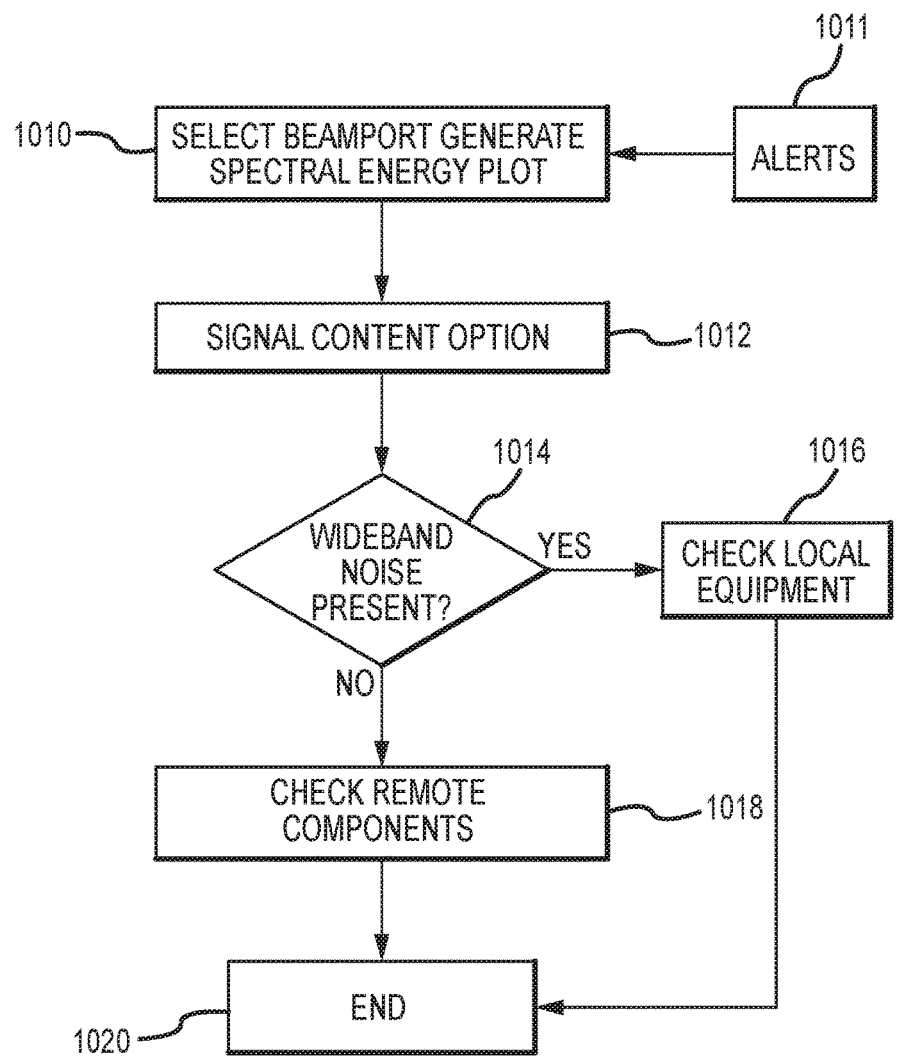
FIG. 10 is flowchart illustrating a process for isolating a source of noise, according to at least one embodiment.

FIG. 10 is a flowchart illustrating a process for isolating a source of wideband noise, according to at least one embodiment. The wideband noise can be an indication that the beamport signal is badly corrupted. According to at least one embodiment, it may be determined if the problem is already present at the SBSS output or if it gets introduced at some point further down the chain. At 1010, the appropriate beamport is selected, and information is collected. As previously discussed, the beamport can be selected in various ways, including number, timeslot, etc. According to various embodiments, the process can optionally be initiated in response to an alert, as indicated at 1011. At 1012, the property to be monitored is selected as the signal content. This can correspond, for example, to selecting an option to produce a spectral energy plot. At 1014, the spectral energy plot is examined in order to identify any observable faults. According to the illustrated embodiment, such a fault can correspond to wideband noise, malformed carriers, or other signal distortions. If such a fault exists, then control passes to 1016 where local components can be further examined. According to one or more embodiments, such an examination can involve systems and components associated with beamport processing within the SBSS. If no observable errors are identified, then control passes to 1018, where it is concluded that the fault originates from an external source such as a remote transmission station or an intermediate component. The process ends at 1020.

Figure 11:
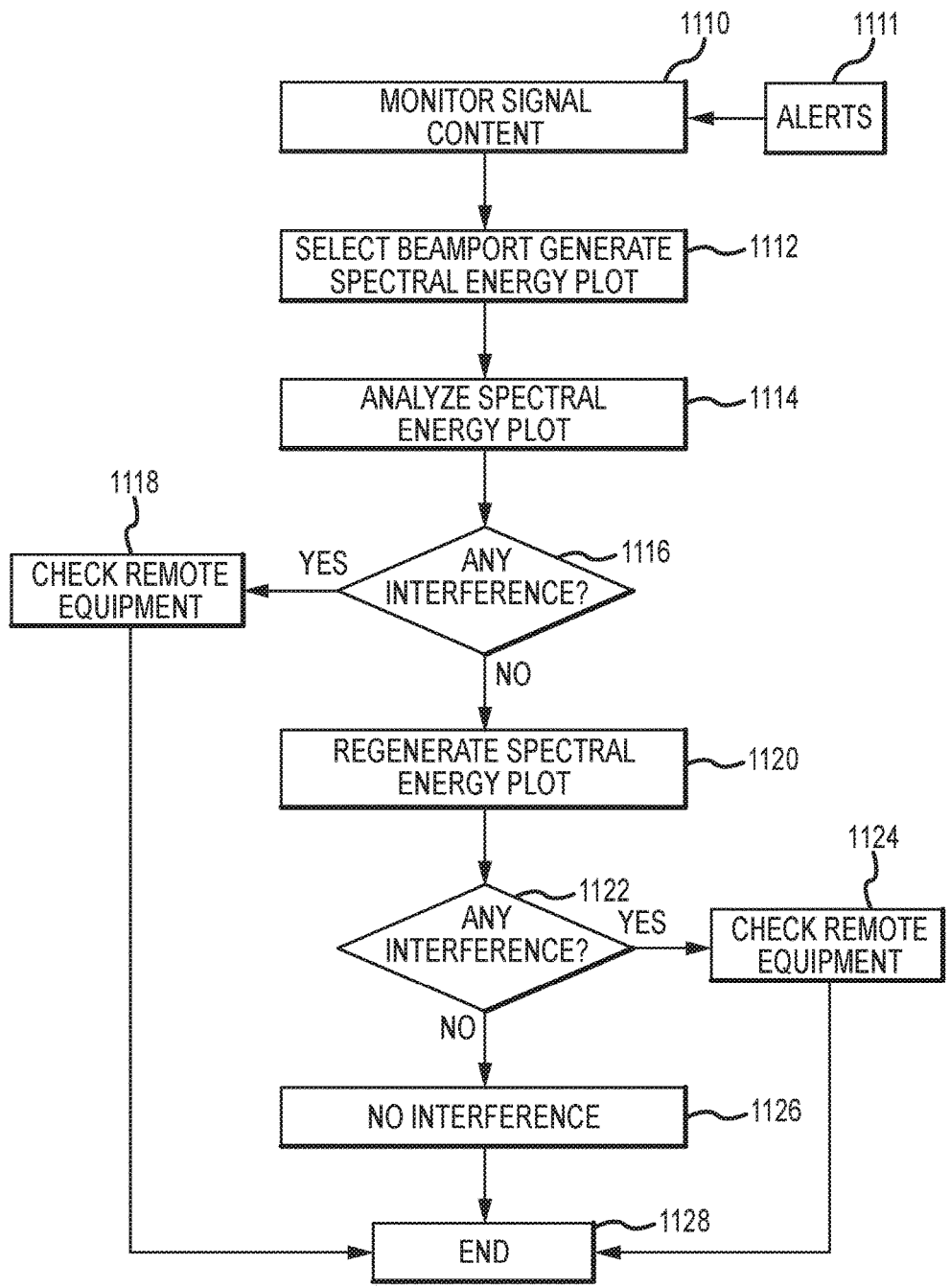
FIG. 11 is flowchart illustrating a process for isolating a source of interference, according to at least one embodiment.

FIG. 11 is a flowchart illustrating a process for isolating a source of interference, according to at least one embodiment. Such a situation can manifest in the form of packets being correctly received at the SBSS on one carrier frequency but not on another, because of potential interference at that carrier frequency. According to an embodiment, debugging and isolating requires a determination as to whether or not the interference can be observed on the signal as it is received by the SBSS. At 1110, and option to obtain signal content is selected. According to various embodiments, the process can optionally be initiated in response to an alert, as indicated at 1111. At 1112, the specific beamport is selected. Additionally, once the desired beamport has been selected, samples are collected and a spectral energy plot is generated. At 1114, the spectral energy plot is analyzed in order to determine information regarding the carriers.

According to at least one embodiment, the spectral energy plot can be checked to confirm that all energy within the received signal appears within the configured carrier frequencies. For example, the presence or absence of particular carriers can be identified, as well as the proper carrier type and carrier positions. At 1116, it is determined whether any interference or anomalies are present in the spectral energy plot. If interference or anomalies are present, then it is determined at 1118 that such interference is present at the SBSS input signal, and therefore appears to originate from an outside source such as a remote transmission station or an intermediate component. If no interference is observed, then a command is issued at 1120 to capture additional samples from the selected beamport and generate a new spectral energy plot.

Depending on various situations, the specific type of interference or anomaly may not be present continuously within the transmit signal. Accordingly, by collecting samples at different time intervals, it may be possible to capture an occurrence of the interference. At 1122, it is again determined whether the interference appears on the spectral energy plot. If any interference or anomaly is observed, then it is determined to originate from an outside source at 1124. If the interference is not observed once again, then at 1126, it is determined that such interference is not present or sporadic in nature. At this point, the process ends. According to one or more embodiments, however, it is possible to obtain additional samples from the beamport in order to make additional attempts at identifying the interference. Such embodiments, therefore, allow for multiple tests to be performed in order to detect the presence of any interference. As can be appreciated, certain types of interference can be intermittent, and not detectable within the timespan of data collection. Such conditions can require additional tests for proper detection. The process ends at 1128.

Figure 12:
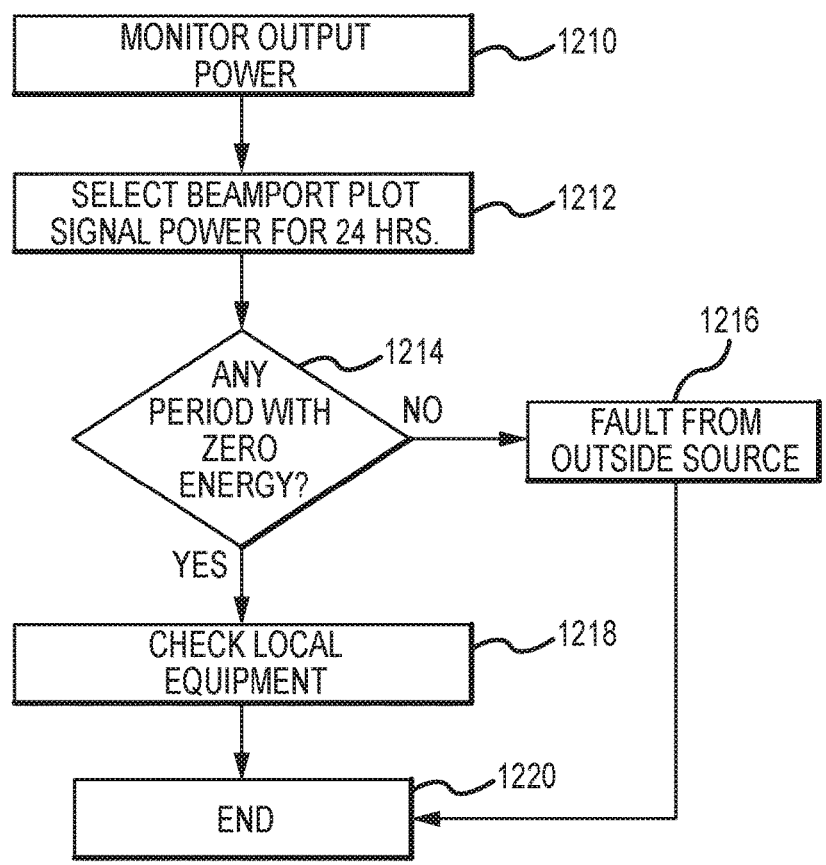
FIG. 12 is flowchart illustrating a process for isolating a source of source of outage, according to at least one embodiment.

FIG. 12 is a flowchart illustrating a process for isolating a source of outage, according to at least one embodiment. This can correspond, for example, to a situation where an outage occurred in the past 24 hours, but the system has automatically recovered. Although normal operations have resumed, the source of the problem should be determined in order to prevent future occurrences. This can be done in accordance with the embodiment illustrated in FIG. 12. According to one or more embodiments, a maximum power threshold may have previously been set, thus causing the system to automatically squelch the transmit signal and/or generate an alarm that must be manually reset by an operator. According to such embodiments, the operator would be aware that the problem occurred due to the squelch feature.

At 1210, an option is selected to monitor power output for one of the beamport. At 1212, the specific beamport is selected, as well as the time interval for which the output power should be monitored. At 1214, it is determined whether or not any periods of time exist where the signal energy drops to zero. If no such time periods are observed, then at 1216, it is determined that the fault occurred at an outside source. However, if a period of zero energy is observed, then at 1218, it is determined that the fault occurred within the SBSS during, the carrier processing. Accordingly, additional tests can be performed on the SBSS components and systems that are used to process the various carriers. The process ends at 1220.

Figure 13:
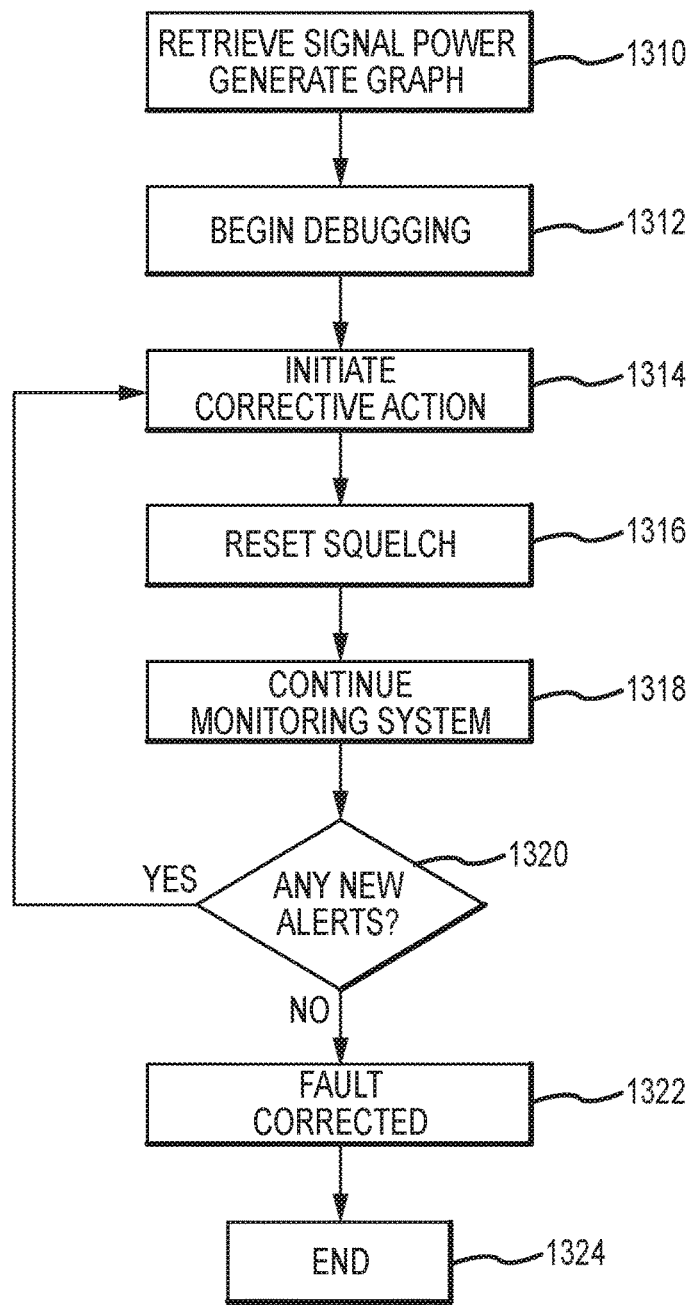
FIG. 13 is flowchart illustrating a process for isolating a source of excess transmit power, according to at least one embodiment.

FIG. 13 is a flowchart illustrating a process for isolating a source of excess transmit power, according to at least one embodiment. As previously discussed, if the transmit power exceeds the maximum power threshold, the output signal is squelched and optionally replaced with a stream of zeros. Furthermore, an alarm is set and maintained until manually cancelled. At 1310, an option is selected to retrieve signal power for a selected beamport. As previously described, according to at least one embodiment, a threshold value can be set for the output power of the transmit signal for any (or all) beamport. Furthermore, the instantaneous output power can be measured continually or over a predetermined time interval. Thus, at 1310, signal power pertaining to the desired beamport is retrieved, for example, from the storage unit. Furthermore, according to at least one embodiment, the information is presented in the form of a graph illustrating output power relative to time. According to other embodiments, the output power can be displayed with respect to sample numbers. As previously discussed, an alert can also be set if the output power exceeds the predetermined threshold.

At 1312, appropriate action is taken to debug the SBSS. According to at least one embodiment, this can include performance of various tests in order to isolate the cause of the high power output condition. Furthermore, it is possible to review the output of other beamports within the same fiber optic line in order to examine their output power and make any comparative analysis. At 1314, corrective action can be taken to correct the fault condition for all affected beamports. For example, if a particular hardware is determined to be defective, it can be replaced and/or repaired. Furthermore, if the fault lies within configurable aspects of a particular hardware unit, then the configuration parameters can be corrected and/or modified in order to prevent future conditions of excess output power. At 1316, the squelch condition affecting the beamport is manually reset. As previously discussed, upon encountering a condition wherein the output power of any beamport exceeds the set threshold, the transmit signal is immediately discontinued, and replaced with a string of zeros. Once the alert has been manually reset, the transmit stream is resumed.

At 1318, the system can be continually monitored in order to ensure that proper operation has been restored. Furthermore, the system can be monitored in order to ensure that additional alerts are not immediately generated. At 1320, it is determined whether the system has operated correctly within the monitoring period set forth in 1318, by checking if any new alerts are activated. If normal operation has not been resumed, or additional instances of excessive transmit power are identified (i.e., new alerts are activated), then additional testing and debugging may be necessary in order to address the problem. Control would then return to 1314 where further corrective action can be taken.

According to further embodiments, control can optionally return to 1312 where the SBSS is again debugged in order to isolate the fault which resulted in the high power condition. This can be done, for example, if all corrective actions have been taken and the problem persists. Thus, further debugging of the SBSS can result in identification of further components and or systems that may be responsible for the fault. If the system operates correctly, however, then at 1322, the fault is designated as being corrected, and the system is returned to normal operation. According to various embodiments, when the system returns to normal operation, all of the beamports within the SBSS are continually monitored in order to detect high transmit power signals which exceed the preset threshold. Information pertaining to the power levels of each beamport can be saved within a file for subsequent retrieval and analysis. Accordingly, if additional alerts are raised, an operator would receive a list of the beamports which have exceeded the threshold value, and appropriate corrective measures can be taken, as previously described. The process ends at 1324.

Figure 14:
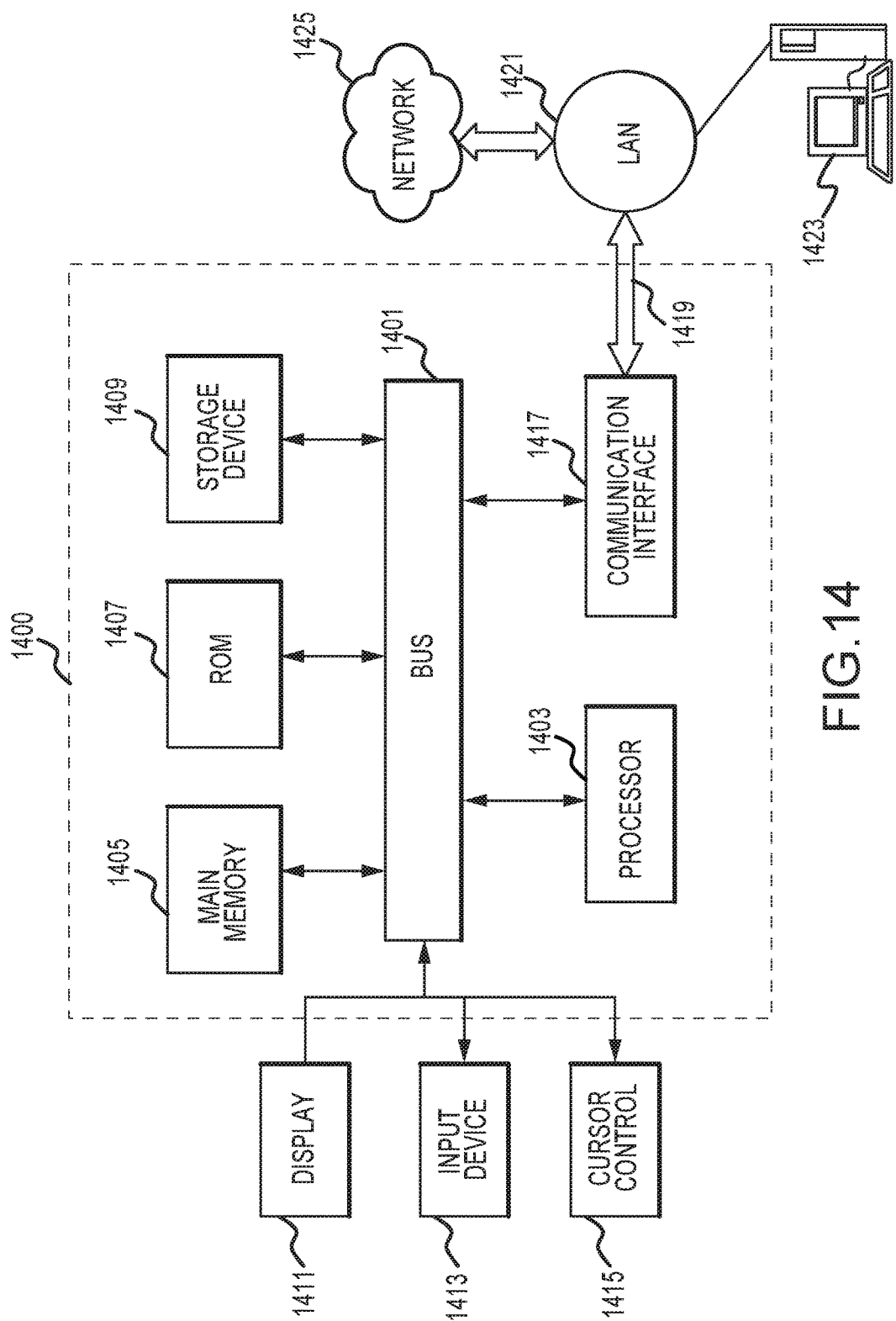
FIG. 14 is a diagram of a computer system that can be used to implement various exemplary embodiments.

FIG. 14 is a diagram of a computer system that can be used to implement various embodiments. The computer system 1400 includes a bus 1401 or other communication mechanism for communicating information and a processor 1403 coupled to the bus 1401 for processing information. The computer system 1400 also includes main memory 1405, such as a random access memory (RAM) or other dynamic storage device, coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a light emitting diode (LED) or other flat panel displays, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411. Additionally, the display 1411 can be touch enabled (i.e., capacitive or resistive) in order facilitate user input via touch or gestures.

According to an exemplary embodiment, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement exemplary embodiments. Thus, exemplary embodiments are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, or any other communication interface to provide a data communication connection to a corresponding type of communication line. As another example, communication interface 1417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a High Definition Multimedia Interface (HDMI), etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 such as a wide area network (WAN) or the Internet. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network (s), the network link 1419, and the communication interface 1417. In the Internet example, a server (not shown) might transmit requested code belonging to an application program for implementing an exemplary embodiment through the network 1425, the local network 1421 and the communication interface 1417. The processor 1403 may execute the transmitted code while being received and/or store the code in the storage device 1409, or other non-volatile storage for later execution. In this manner, the computer system 1000 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Non-volatile media can further include flash drives, USB drives, microSD cards, etc. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a USB drive, microSD card, hard disk, optical disk (e.g., DVD, DVD RW, Blu-ray), or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a networking connection such as a cable modem or LAN card. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving at least one alert indicative of a system fault, a system failure, or both;
   selecting one or more fiber optic lines for examination based, at least in part, on the received at least one alert, the one or more fiber optic lines supplying a transmit signal and a receive signal to/from a remote transmission station;
   selecting at least one property of the transmit signal and/or a receive signal to be monitored;
   monitoring, using a data acquisition unit, the transmit signal and/or receive signal in the one or more fiber optic lines;
   retrieving, by an element management subsystem (EMS), information corresponding to the at least one property for a predetermined period of time;
   generating a visual representation of the retrieved information;
   performing an analysis of the retrieved information and/or the visual representation;
   supplying information for at least one status of one or more components associated with the transmit signal based, at least in part, on the analysis; and
   automatically squelching the transmit signal if the at least one status is associated with excess output power of the transmit signal.

2. The apparatus of claim 1, wherein the processor is further configured to:
   receive input for selecting at least one property by facilitating input of a request for signal content of a selected beamport; and
   collect a predetermined number of samples obtained by the data acquisition unit,
   wherein the predetermined number of samples are obtained from the transmit signal, the receive signal, or both of a prescribed fiber optic line containing the selected beamport.

3. The apparatus of claim 2, wherein the processor is further configured to:
   generate the visual representation by converting information corresponding to collected samples to a frequency domain, and generating a spectral analysis plot of power density relative to carrier frequency; and
   identify carriers, carrier type, carrier positions, absence of carriers, or a combination thereof from the spectral analysis plot.

4. The method of claim 1, wherein supplying information includes identifying at least one beamport, within the selected one or more fiber optic lines, which carries the transmit signal and/or the receive signal.

5. The method of claim 1, wherein the at least one status is indicative of a malfunction at the remote transmission station, an intermediate component, a local station, or a combination thereof.

6. The method of claim 1, wherein performing an analysis further comprises:
   producing a theoretical representation of the at least one property corresponding to the visual representation; and
   comparing the theoretical representation to the retrieved information used to generate the visual representation.

7. The method of claim 1, wherein the retrieved information is obtained from a storage unit, the one or more fiber optic lines, or both.

8. The method of claim 1, wherein:
selecting at least one property comprises selecting a power output for a selected beamport; and
monitoring comprises measuring instantaneous, minimum, and maximum power levels for the selected beamport, and producing an output power profile for the predetermined period of time.

9. The method of claim 8, wherein:
selecting at least one property further comprises inputting a threshold value for output power of the transmit signal in a selected beamport;
performing an analysis further comprises comparing instantaneous output power of the transmit signal for the selected beamport to the threshold value; and
automatically squelching comprises squelching the transmit signal if the instantaneous output power exceeds the threshold value.

10. The method of claim 9, further comprising:
replacing the transmit signal with a sample stream of zero values; and
initiating an alert indicative of excessive output power, wherein the sample stream of zero values is transmitted until the alert is manually reset.

11. The method of claim 1, wherein:
selecting at least one property comprises requesting signal content for a selected beamport; and
monitoring comprises collecting, from the selected beamport, a predetermined number of samples from the transmit signal, the receive signal, or both.

12. The method of claim 11, wherein:
generating visual representation comprises converting information corresponding to collected samples to a frequency domain, and generating a spectral analysis plot of power density relative to carrier frequency; and
performing an analysis comprises identifying carriers, carrier type, carrier positions, absence of carriers or a combination thereof from the spectral analysis plot.

13. The method of claim 1, wherein:
selecting at least one property comprises requesting information retrieval for a selected beamport; and
monitoring comprises collecting, from the selected beamport, information corresponding to a predetermined number of samples from the transmit signal, the receive signal, or both.

14. The method of claim 13, wherein:
generating visual representation comprises displaying a modulated carrier signal corresponding to the collected information; and
performing an analysis comprises performing offline demodulation and/or analysis of the collected information.

15. The method of claim 1, wherein selecting one or more fiber optic lines further comprises:
identifying a packet channel unit containing a plurality of fiber optic nodes; and
selecting the one or more fiber optic lines from one of the plurality of fiber optic nodes.

16. An apparatus comprising:
one or more fiber optic lines for supplying a transmit signal and a receive signal to/from a remote transmission station;
a data acquisition unit for acquiring information from the one or more fiber optic lines, and for monitoring the transmit signal and/or receive signal in the one or more fiber optic lines;
an element management subsystem (EMS) configured to retrieve information corresponding to the at least one property for a predetermined period of time; and
a processor configured to:
output at least one alert indicative of a system fault, a system failure, or both;
receive input for selecting one or more fiber optic lines for examination based, at least in part, on the received at least one alert,
receive input for selecting at least one property of the transmit signal and/or a receive signal to be monitored,
output a visual representation of the information retrieved by the EMS,
perform an analysis of the retrieved information and/or facilitate analysis of the visual representation,
output information for at least one status of one or more components associated with the transmit signal based, at least in part, on the analysis, and
automatically squelch the transmit signal if the at least one status is associated with excess output power of the transmit signal.

17. The apparatus of claim 16, wherein:
the processor is further configured to receive input for selecting a packet channel unit containing a plurality of fiber optic nodes; and
the one or more fiber optic lines are selected from one of the plurality of fiber optic nodes contained in the selected packet channel unit.

18. The apparatus of claim 16, wherein the information output includes at least one beamport, within the selected one or more fiber optic lines, which carries the transmit signal and/or the receive signal.

19. The apparatus of claim 16, wherein the information output is indicative of a malfunction at the remote transmission station, an intermediate component, a local station, or a combination thereof.

20. The method of claim 16, wherein processor is further configured to:
produce a theoretical representation of the at least one property corresponding to the visual representation; and
compare the theoretical representation to the retrieved information used to visual representation.

21. The apparatus of claim 16, wherein the EMS is configured to retrieve information from a storage unit, the data acquisition unit, or both.

22. The apparatus of claim 16, wherein:
the processor is further configured to receive input for selecting a power output for a selected beamport; and
the data acquisition unit is configured to measure instantaneous, minimum, and maximum power levels for the selected beamport, and produce an output power profile for the predetermined period of time.

23. The apparatus of claim 22, wherein the processor is further configured to:
receive input for setting a threshold value for output power of the transmit signal in a selected beamport;
compare instantaneous output power of the transmit signal for the selected beamport to the threshold value; and
automatically squelch the transmit signal if the instantaneous output power exceeds the threshold value.

24. The apparatus of claim 23, wherein the processor is further configured to:
  replace the transmit signal with a sample stream of zero values; and
  initiate an alert indicative of excessive output power, wherein the sample stream of zero values is transmitted until the alert is manually reset.

25. The apparatus of claim 16, wherein the processor is further configured to:
  receive input for selecting at least one property by facilitating input of a request for information retrieval capture for a selected beamport; and
  collect information corresponding to a predetermined number of samples from the data acquisition unit,
  wherein the collected information is obtained from the transmit signal, the receive signal, or both of a prescribed fiber optic line containing the selected beamport.

26. The apparatus of claim 25, wherein the processor is further configured to:
  display a modulated carrier signal corresponding to the collected information; and
  perform offline demodulation and/or analysis of the collected information.

* * * * *

UNITED STATES PATENT AND TRADEMARK OFFICE
CERTIFICATE OF CORRECTION

| | |
|---|---|
| PATENT NO. | : 9,571,188 B2 |
| APPLICATION NO. | : 14/564838 |
| DATED | : February 14, 2017 |
| INVENTOR(S) | : Bhanu P. Durvasula et al. |

Page 1 of 1

It is certified that error appears in the above-identified patent and that said Letters Patent is hereby corrected as shown below:

Claim 22, Line 4, please replace the word "predeteimined" with "predetermined"

Signed and Sealed this
Eleventh Day of June, 2019

Andrei Iancu
*Director of the United States Patent and Trademark Office*